(12) United States Patent
Kimata et al.

(10) Patent No.: US 11,899,999 B2
(45) Date of Patent: Feb. 13, 2024

(54) IMAGE FORMING APPARATUS, INFORMATION PROCESSING TERMINAL, METHOD, AND PROGRAM

(71) Applicant: Konica Minolta Inc., Tokyo (JP)

(72) Inventors: Akinori Kimata, Toyokawa (JP); Kenichi Hayashi, Anjo (JP); Shiro Umeda, Toyokawa (JP); Yukinobu Iguchi, Hamamatsu (JP); Satoru Sasaki, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/872,501

(22) Filed: Jul. 25, 2022

(65) Prior Publication Data
US 2023/0035820 A1    Feb. 2, 2023

(30) Foreign Application Priority Data
Aug. 2, 2021  (JP) ................................. 2021-126414

(51) Int. Cl.
*G06F 15/00* (2006.01)
*G06F 3/12* (2006.01)

(52) U.S. Cl.
CPC .......... *G06F 3/1258* (2013.01); *G06F 3/1204* (2013.01); *G06F 3/1256* (2013.01)

(58) Field of Classification Search
CPC ..... G06F 3/1258; G06F 3/1204; G06F 3/1256
USPC ......................................................... 358/471
See application file for complete search history.

(56) References Cited

U.S. PATENT DOCUMENTS

2008/0143776 A1*  6/2008  Konno ................... B41J 2/2132
                                                                347/19
2020/0379688 A1* 12/2020  Sugiura ................. G06F 3/1203

FOREIGN PATENT DOCUMENTS

JP          2018106112 A        7/2018

* cited by examiner

*Primary Examiner* — Mark R Milia
(74) *Attorney, Agent, or Firm* — RANKIN, HILL & CLARK LLP

(57) ABSTRACT

An image forming apparatus includes: a former that performs image formation on a sheet conveyed on a conveyance path; a first hardware processor that detects a type of the sheet on which the image is formed; a second hardware processor that receives specification of a type of a sheet from a user; and a third hardware processor that receives a user setting regarding the image formation, wherein the user setting includes a setting for allowing the former to continuously perform the image formation in a case where the sheet type detected by the first hardware processor is different from the sheet type specified by the user received by the second hardware processor.

17 Claims, 18 Drawing Sheets

FIG. 11

| 931: ITEM | 932: PRIORITY BETWEEN PAPER TYPES | | | | | | |
|---|---|---|---|---|---|---|---|
| | THIN PAPER | PLAIN PAPER (ECO) | PLAIN PAPER | THICK PAPER 1 | THICK PAPER 2 | THICK PAPER 3 | THICK PAPER 4 |
| PRODUCTIVITY | 1 | 2 | 3 | 4 | 5 | 6 | 7 |
| IMAGE QUALITY | PRIORITY OF DETECTED TYPE IS HIGH | | | | | | |
| POWER SAVING | 1 | 2 | 3 | 4 | 5 | 6 | 7 |

IMAGE FORMING APPARATUS, INFORMATION PROCESSING TERMINAL, METHOD, AND PROGRAM

The entire disclosure of Japanese patent Application No. 2021-126414, filed on Aug. 2, 2021, is incorporated herein by reference in its entirety.

BACKGROUND

Technological Field

The present disclosure relates to a configuration of detecting a type of conveyed paper in an image forming apparatus.

Description of the Related Art

Various proposals have been made on detection of a type of paper in an image forming apparatus such as a multi-functional peripheral (MFP) having a plurality of functions such as printing, copying, and facsimile. For example, JP 2018-106112 A discloses a configuration of interrupting image formation in a case where a first medium characteristic of a recording material during conveyance detected by a medium detector is different from a second medium characteristic of a stored recording material on which an image is already formed.

As disclosed in JP 2018-106112 A, when image forming processing is interrupted due to the difference in medium characteristic as described above after the image forming processing such as printing is started, for example, convenience of a user of the image forming apparatus is deteriorated. For example, the user is required to perform an operation of replenishing the image forming apparatus with a medium such as paper of a type that matches the medium characteristic and restarting the interrupted image forming processing. Since the image forming processing is interrupted, it takes time for the user to acquire a processing result.

SUMMARY

An object of the present disclosure is to provide a technology for continuously performing image formation in a case where a type of a sheet detected at the time of image formation is different from a type of a sheet specified by a user.

To achieve the abovementioned object, according to an aspect of the present invention, an image forming apparatus reflecting one aspect of the present invention comprises: a former that performs image formation on a sheet conveyed on a conveyance path; a first hardware processor that detects a type of the sheet on which the image is formed; a second hardware processor that receives specification of a type of a sheet from a user; and a third hardware processor that receives a user setting regarding the image formation, wherein the user setting includes a setting for allowing the former to continuously perform the image formation in a case where the sheet type detected by the first hardware processor is different from the sheet type specified by the user received by the second hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 11 is a diagram illustrating an example of priority determination data according to this embodiment;

DETAILED DESCRIPTION OF EMBODIMENTS

Hereinafter, an embodiment of an image forming apparatus according to the present invention will be described with reference to the drawings. However, the scope of the invention is not limited to the disclosed embodiment. In the following description, the same parts and components are assigned with the same reference signs. Their names and functions are also the same. Therefore, the description thereof is not repeated.

In this embodiment, an MFP 1 is exemplified as the image forming apparatus, but this embodiment is not limited to such a multi-functional peripheral, and may be applied to, for example, a printer, a copier and the like.

In this embodiment, a sheet-shaped recording medium made of a material on which an image is formed is collectively referred to as a "sheet". Although a case where the material is "paper" as the sheet of the recording medium is described in this embodiment, a material other than paper may also be used. For example, the sheet of the recording medium may also include a sheet of a resin material, a textile material and the like.

This embodiment provides a configuration in which, when the image forming apparatus performs image formation on a sheet conveyed through a conveyance path, even in a case where a sheet type detected for the conveyed sheet is different from a sheet type specified by a user regarding the image formation, the image formation may be continuously performed without interruption. Hereinafter, for the sake of description, a case where the sheet type detected for the conveyed sheet is different from the sheet type specified by the user regarding the image formation might be referred to as a "different type case", the detected sheet type might be referred to as a "detected type", the sheet type specified by the user might be referred to as a "specified type", and the sheet type selected for continuing the image formation might be referred to as a "selected type".

<1. Schematic Configuration of Image Forming Apparatus>

Figure 1:
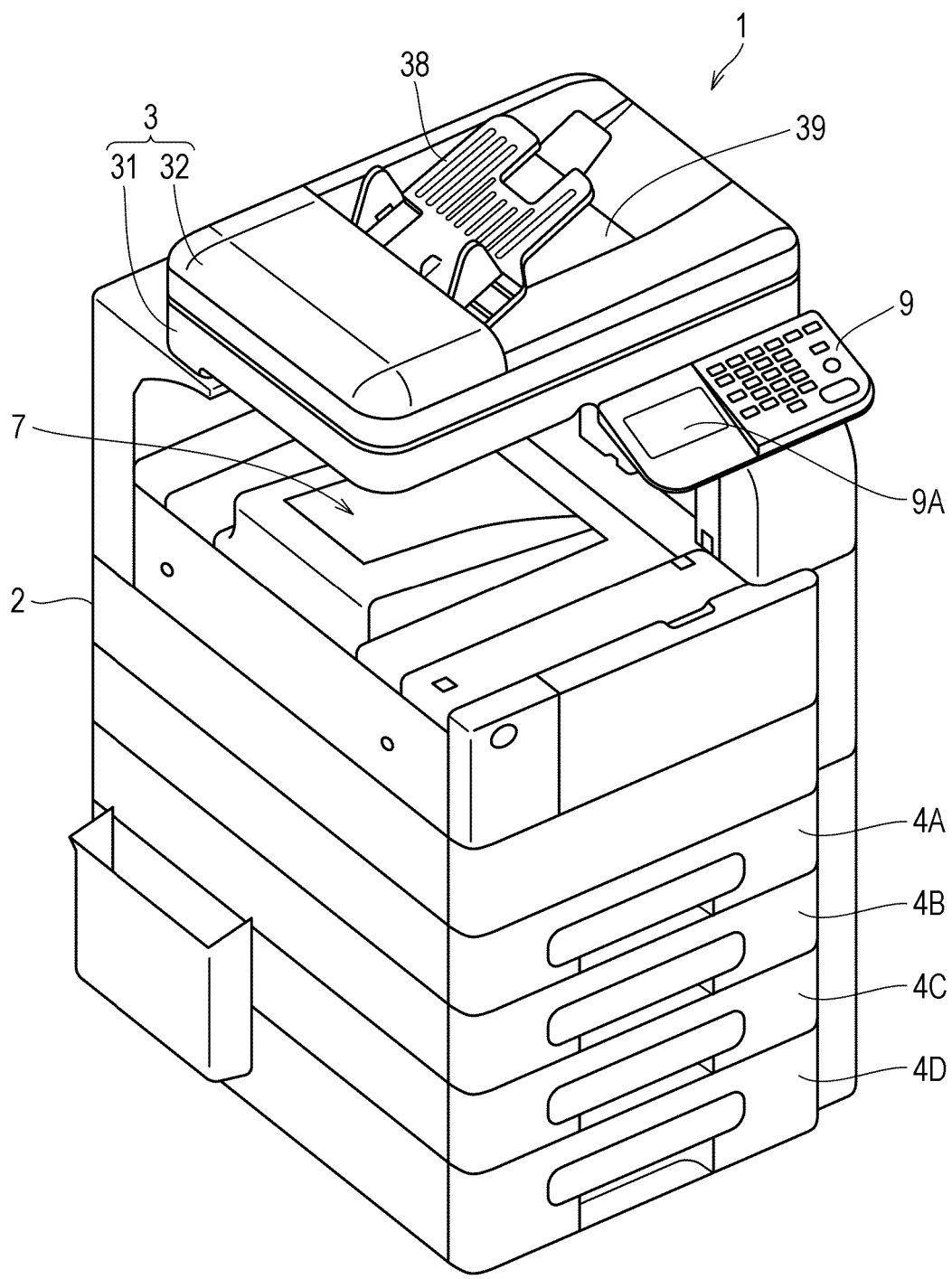
FIG. 1 is a view illustrating an appearance of an MFP as an embodiment of an image forming apparatus according to an embodiment of the present disclosure.
Figure 2:
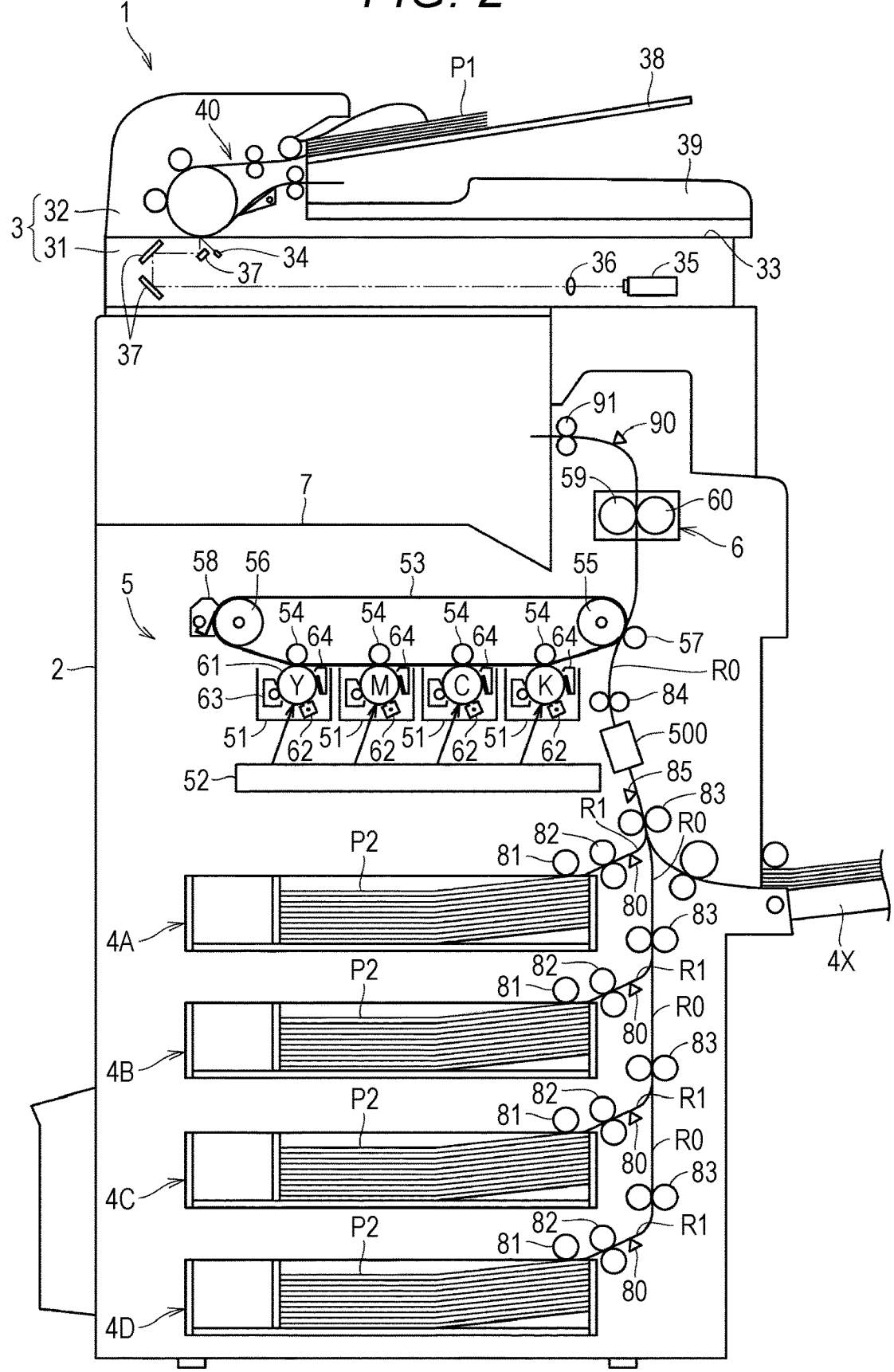
FIG. 2 is a diagram schematically illustrating an internal configuration of the MFP.

FIG. 1 is a view illustrating an appearance of the MFP 1 as an embodiment of the image forming apparatus of the present disclosure. FIG. 2 is a diagram schematically illustrating an internal configuration of the MFP 1. Hereinafter, a configuration regarding image formation by printing of the MFP 1 is mainly described.

As illustrated in FIGS. 1 and 2, the MFP 1 includes an image reading unit 3 that reads an image from an original P1, paper feed trays 4A to 4D that store paper P2 being a recording medium on which an image is to be formed, a transfer unit 5 that transfers a toner image to the paper P2, a fixing unit 6 that fixes the toner image transferred by the transfer unit 5 to the paper P2, a paper ejection tray 7 to which the paper P2 on which the image is formed through fixing by the fixing unit 6 is ejected, and an operation panel 9 that receives a user operation on the MFP 1. In an apparatus main body 2 of the MFP 1, the image reading unit 3 is provided in an upper portion, and the transfer unit 5 is provided in a lower portion. The operation panel 9 may form a touch panel obtained by integrally forming a touch sensor and a display 9A. The operation panel 9 may also be formed by arranging hardware buttons.

As described above, the MFP 1 is provided with the four paper feed trays 4A to 4D. Each of the paper feed trays 4A to 4D forms a supply unit formed to be able to store a sheet to be supplied to the conveyance path. The number of paper feed trays included in the MFP 1 according to this embodiment is not limited to plural; one or a plurality of trays may be included. A manual feed tray 4X to be described later may also form this paper feed unit. In this embodiment, in a case where a property common to the paper feed trays 4A to 4D and the manual feed tray 4X is mentioned, the paper feed trays 4A to 4D and the manual feed tray 4X might be referred to as a "paper feed tray 4".

In the MFP 1, the paper ejection tray 7 is provided above the transfer unit 5 for receiving the paper P2 on which the image is recorded by the transfer unit 5 and the fixing unit 6 to be ejected. The paper feed tray 4 is provided below the transfer unit 5. The paper feed tray 4 may be inserted into and removed from the apparatus main body 2. In the MFP 1, the paper P2 stored in the paper feed tray 4 is fed into the apparatus main body 2. The paper P2 is conveyed upward to be sent to the transfer unit 5 arranged above the paper feed tray 4, and an image is transferred thereto by the transfer unit 5. The fixing unit 6 fixes the image transferred to the paper P2. The paper P2 is processed by the fixing unit 6 and then ejected to the paper ejection tray 7. The paper ejection tray 7 is provided in a space (recessed space) between the image reading unit 3 and the transfer unit 5.

The image reading unit 3 includes a scanner unit 31 that reads the image from the original P1, and an auto document feeder (ADF) 32 that is provided above the scanner unit 31 and conveys the original P1 one by one to the scanner unit 31. The operation panel 9 is provided on a front side (anterior side) of the apparatus main body 2. By performing a key operation while viewing a display screen and the like of the operation panel 9, the user may perform a setting operation for a function selected out of various functions of the MFP 1, or instruct the MFP 1 to perform work.

An internal structure of the apparatus main body 2 is described with reference to FIG. 2. The scanner unit 31 of the image reading unit 3 includes an original table 33 including a platen glass (not illustrated) on an upper surface side thereof, a light source unit 34 that irradiates the original P1 with light, an image sensor 35 that photoelectrically converts reflected light from the original P1 into image data, an image forming lens 36 that forms an image of the reflected light on the image sensor 35, and a mirror group 37 that sequentially reflects the reflected light from the original P1 and allows the same to be incident on the image forming lens 36.

The light source unit 34, the image sensor 35, the image forming lens 36, and the mirror group 37 are provided inside the original table 33. The light source unit 34 and the mirror group 37 are formed to be movable right and left with respect to the original table 33.

The ADF 32 is provided on an upper surface side of the scanner unit 31. The ADF 32 may be opened and closed with respect to the original table 33, and is provided with an original placement tray 38 and an original ejection tray 39. The ADF 32 may cover the original P1 on the platen glass (not illustrated) of the original table 33 to bring the original P1 into close contact with the platen glass (not illustrated).

In the image reading unit 3, in a case where the original P1 on the platen glass (not illustrated) of the original table 33 is read, the original P1 is irradiated with light from the light source unit 34 moving rightward (in a sub-scanning direction). The reflected light reflected from the original P1 is sequentially reflected by the mirror group 37 moving rightward like the light source unit 34 to be incident on the image forming lens 36, and forms an image on the image sensor 35. The image sensor 35 executes photoelectric conversion for each pixel according to intensity of incident light, and generates an image signal (RGB signal) corresponding to the image of the original P1.

In contrast, in a case where the image sensor 35 reads the original P1 placed on the original placement tray 38, the original P1 is conveyed to a read position by a document conveyance mechanism 40 formed of a plurality of rollers and the like. The light source unit 34 and the mirror group 37 of the scanner unit 31 are fixed at predetermined positions inside the original table 33. The light source unit 34 irradiates a read position part of the original P1 with light, and the reflected light forms an image on the image sensor 35 via the mirror group 37 and the image forming lens 36 of the scanner unit 31. Thereafter, the image sensor 35 converts the reflected light into the image signal (RGB signal) corresponding to the image of the original P1. Thereafter, the original P1 is ejected to the original ejection tray 39.

The transfer unit 5 that transfers the toner image to the paper P2 includes image forming units 51 that generate toner images of respective colors of yellow (Y), magenta (M), cyan (C), and key tone (K), respectively, an exposure unit 52 provided below the image forming units 51, an intermediate transfer belt 53 that abuts the image forming units 51 of the respective colors arranged in a horizontal direction, so that the toner images of the respective colors are transferred from the image forming units 51, primary transfer rollers 54 provided at positions facing the image forming units 51 of the respective colors from above so as to interpose the intermediate transfer belt 53 together with the image forming units 51, a driving roller 55 that rotates the intermediate transfer belt 53, a driven roller 56 that rotates as the rotation of the driving roller 55 is transmitted via the intermediate transfer belt 53, a secondary transfer roller 57 installed at a position facing the driving roller 55 with the intermediate transfer belt 53 interposed therebetween, and a cleaner unit 58 installed at a position facing the driven roller 56 with the intermediate transfer belt 53 interposed therebetween.

The image forming unit 51 includes a photoconductor drum 61 that abuts an outer peripheral surface of the intermediate transfer belt 53, a charger 62 that charges the outer peripheral surface of the photoconductor drum 61 by corona discharge, a developer 63 that adheres toner stirred to be charged to the outer peripheral surface of the photoconductor drum 61, and a cleaner unit 64 that removes toner remaining on the outer peripheral surface of the photoconductor drum 61 after the toner image is transferred to the intermediate transfer belt 53. At that time, the photoconductor drum 61 is installed at a position facing the primary transfer roller 54 with the intermediate transfer belt 53 interposed therebetween, and rotates clockwise in FIG. 2. Around the photoconductor drum 61, the primary transfer roller 54, the cleaner unit 64, the charger 62, and the developer 63 are arranged in order in a rotational direction of the photoconductor drum 61.

The intermediate transfer belt 53 is formed of, for example, an endless belt member having conductivity. The intermediate transfer belt 53 is wound around the driving roller 55 and the driven roller 56 without looseness, thereby rotating counterclockwise in FIG. 2 as the driving roller 55 rotates. Around the intermediate transfer belt 53, the secondary transfer roller 57, the cleaner unit 58, and the image forming units 51 of the respective colors of Y, M, C, and K are arranged in order in a rotational direction of the intermediate transfer belt 53.

The fixing unit 6 fixes the toner image transferred to the paper P2. The fixing unit 6 includes a heating roller 59 provided with a halogen lamp and the like that heats for fixing the toner image on the paper P2, and a pressurizing roller 60 that interposes the paper P2 together with the heating roller 59 to pressurize the paper P2. The heating roller 59 may generate an eddy current on a surface thereof by electromagnetic induction to heat the surface of the heating roller 59.

In the MFP 1, the paper feed tray is connected to a paper feed path R1. A conveyance device that conveys the paper P2 includes a delivery roller 81 that delivers the paper P2 stored in the paper feed tray to the paper feed path R1 from the uppermost one, a paper feed roller pair 82 that further sends out the delivered paper P2 to the paper feed path R1, a conveyance roller pair 83 that vertically conveys the paper P2 fed by the paper feed roller pair 82 through a main conveyance path R0, and a skew correction roller 84 that is arranged downstream of the conveyance roller pair 83 on the main conveyance path R0 and conveys the paper P2 toward the transfer unit 5. In the paper feed tray, a paper feed sensor 80 for detecting the paper P2 delivered from the paper feed tray is provided.

The main conveyance path R0 is a main conveyance route of the paper P2 at an image forming (printing) step. The paper feed path R1 is provided for each paper feed tray. Each paper feed path R1 joins the main conveyance path R0. The paper feed path R1 is an example of a conveyance path.

The paper P2 stored in the paper feed tray is sent out to the paper feed path R1 one by one from the uppermost one by rotational drive of the delivery roller 81 corresponding to the paper feed tray, and then sent out to the main conveyance path R0 by the paper feed roller pair 82. The paper feed sensor 80 detects the paper P2 sent out from each of the paper feed trays 4A to 4D to the paper feed path R1.

On the main conveyance path R0, the paper P2 conveyed from the paper feed roller pair 82 is conveyed toward the skew correction roller 84 arranged in front of the transfer unit 5 by rotational drive of the conveyance roller pair 83. The skew correction roller 84 conveys the paper P2 to the transfer unit 5 in synchronization with a toner image forming timing by the transfer unit 5 in order to allow the transfer unit 5 to normally transfer the toner image to the paper P2. That is, when the recording paper is conveyed to the skew correction roller 84 by the conveyance roller pair 83, the skew correction roller 84 is put into a stopping state, so that the paper P2 is loosened to form a loop, and the paper is conveyed to the secondary transfer roller 57 after paper skew thereof is corrected by the loop.

On the main conveyance path R0, a conveyance sensor (recording paper detection unit) 85 for detecting the paper P2 vertically conveyed by the conveyance roller pair 83 is installed above the conveyance roller pair 83 (downstream side in the conveyance direction). The skew correction roller 84 is an example of a registration roller.

A paper sensor 500 is provided below the skew correction roller 84 (upstream side in the conveyance direction). The paper sensor 500 includes a sensor as described later. In the MFP 1, a type of the paper P2 may be detected on the basis of a signal from the sensor of the paper sensor 500. The MFP 1 sets a process parameter (such as a conveyance speed of the paper P2) that is a control condition for image formation on the paper P2 on the basis of a detection result of the type of the paper P2.

The MFP 1 detects a leading end of the paper P2 that reaches in front of the skew correction roller 84 on the basis of the signal from the paper sensor 500, and paper conveyance and loop control on the main conveyance path R0 may be executed on the basis of a timing at which the paper P2 reaches the skew correction roller 84 from the paper sensor 500.

A paper ejection roller pair 91 that ejects the printed paper P2 is arranged at a terminal end on a most downstream side of the main conveyance path R0. The printed paper P2 is ejected to the paper ejection tray 7 by rotational drive of the paper ejection roller pair 91. On the main conveyance path R0, a paper ejection sensor 90 that detects a rear end of the paper P2 is arranged below the paper ejection roller pair 91 (upstream side in the conveyance direction). As a result, the paper ejection sensor 90 detects the rear end of the paper P2, so that it may be confirmed that the paper P2 is normally ejected from the paper ejection roller pair 91 to the paper ejection tray 7.

<2. Hardware Configuration>

Figure 3:
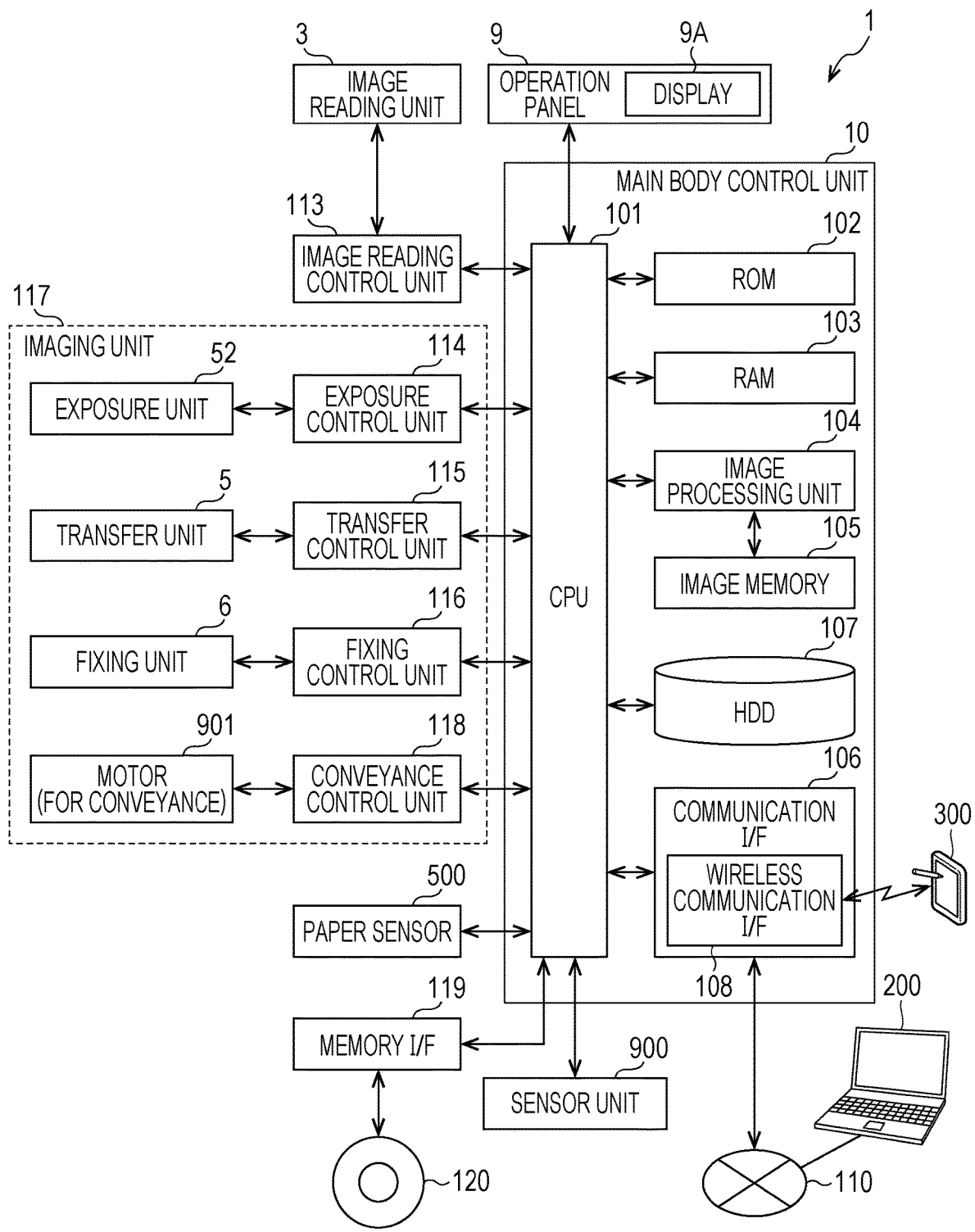
FIG. 3 is a diagram illustrating a hardware configuration of the MFP.

FIG. 3 is a diagram illustrating a hardware configuration of the MFP 1. The MFP 1 includes a main body control unit 10 having the configuration illustrated in FIG. 3. The main body control unit 10 controls each unit forming the MFP 1. As a result, various operations (a printing operation on the paper P2, an image reading operation from the original P1 and the like) in the MFP 1 are executed.

The main body control unit 10 includes a central processing unit (CPU) 101 that executes various pieces of arithmetic processing and control, a read only memory (ROM) 102 that stores a control program and the like, a random access memory (RAM) 103 that temporarily stores arithmetic data, an image processing unit 104 that generates image data on which the toner image to be formed by the transfer unit 5 is based, an image memory 105 that temporarily stores the image data acquired by the image processing unit 104, a communication interface (I/F) 106 including a wireless communication interface (I/F) 108, and a hard disk drive (HDD) 107 as an example of a nonvolatile storage medium. The image processing unit 104 may be formed of a dedicated processor circuit forming an image processing engine, or may be formed by a combination of an image processing program executed by the CPU 101 and a circuit.

The communication I/F 106 includes a circuit such as a network interface card (NIC) in order to control communication between the MFP 1 and an external device. The communication I/F 106 controls communication between the MFP 1 and a terminal 200 operable by the user such as a personal computer via an external network 110. The network 110 includes various networks such as a local area network (LAN) and the Internet. The wireless communication I/F 108 of the communication I/F 106 controls wireless communication between the MFP 1 and a portable terminal 300 operable by the user.

The CPU 101 outputs a signal to each of an image reading control unit 113, an exposure control unit 114, a transfer control unit 115, a fixing control unit 116, and a conveyance control unit 118 that drive and control the image reading unit 3, the exposure unit 52, the transfer unit 5, the fixing unit 6, and a paper feed device 8, respectively, on the basis of the control program read from the ROM 102. Therefore, the signal is provided from the main body control unit 10 to each of the image reading control unit 113, the transfer control unit 115, and the fixing control unit 116, so that the MFP 1 drives each of the image reading unit 3, the exposure unit 52, the transfer unit 5, and the fixing unit 6 according to a specified operation. When the signal is provided from the main body control unit 10 to the conveyance control unit 118, the MFP 1 rotationally drives the delivery roller 81, the roller pairs 82, 83, and 91, and the skew correction roller 84 in the conveyance device. A motor 901 is a motor for driving various rollers for conveying the recording paper in the MFP 1. Drive of the various rollers may be implemented by the CPU 101 controlling an operation of the motor 901 via the conveyance control unit 118.

In this embodiment, the MFP 1 includes an imaging unit 117 that forms an image on the paper P2 conveyed to the conveyance path. The imaging unit 117 includes the exposure unit 52, the transfer unit 5, and the fixing unit 6 forming the image forming unit 51, and the motor 901, and the exposure control unit 114, the transfer control unit 115, the fixing control unit 116, and the conveyance control unit 118 that control them, respectively.

The paper sensor 500 is connected to the CPU 101. The CPU 101 controls an operation of the paper sensor 500, and detects the type of the paper P2 on the basis of the signal from the paper sensor 500. A sensor unit 900 including various sensors included in the MFP 1 is connected to the CPU 101. The CPU 101 detects a state of each unit of the MFP 1 on the basis of a signal from the sensor unit 900.

<3. Printing Operation>

Next, the printing operation by the MFP 1 is described below. When the MFP 1 is instructed to perform the printing operation by the operation panel 9 or an external terminal, in the main body control unit 10, the CPU 101 reads the control program for the printing operation from the ROM 102 and starts a control operation for the printing operation. The CPU 101 first drives and controls the conveyance device via the conveyance control unit 118 to deliver the uppermost paper P2 from the paper feed tray and send out the same to the main conveyance path R0.

In order to transfer the toner image to the paper P2 sent out to the main conveyance path R0, the CPU 101 provides control signals to the exposure control unit 114 and the transfer control unit 115 to drive and control the exposure unit 52 and the transfer unit 5, respectively. At that time, the CPU 101 provides the image signal read from the original P1 by the image reading unit 3 via the image reading control unit 113 or the image signal received from the external terminal via the input/output interface 106 to the image processing unit 104.

As a result, the image processing unit 104 generates the image data for forming the toner image of each color of Y, M, C, and K on the basis of the provided image signal, and stores the same in the image memory 105. The image data of each color of Y, M, C, and K stored in the image memory 105 is read by the CPU 101 and provided to the exposure control unit 114. Therefore, the exposure control unit 114 drives a light emitting element (not illustrated) in the exposure unit 52 on the basis of the image data of each color of Y, M, C, and K, thereby forming an electrostatic latent image on the photoconductor drum 61 of each color of Y, M, C, and K. That is, since the transfer control unit 115 drives the transfer unit 5, in the image forming unit 51 of each color of Y, M, C, and K, a surface of the photoconductor drum 61 charged by the charger 62 is irradiated with laser light from the exposure unit 52, and the electrostatic latent image corresponding to the image of each color of Y, M, C, and K is formed.

The toner charged by the developer 63 is transferred to the surface of the photoconductor drum 61 on which the electrostatic latent image is formed, and the toner image is formed on the photoconductor drum 61 serving as a first image carrier. When the toner image carried on the surface of the photoconductor drum 61 comes into contact with the intermediate transfer belt 53, this is transferred to the intermediate transfer belt 53 by an electrostatic force of the primary transfer roller 54, so that a toner image in which respective colors of Y, M, C, and K overlap is formed on a surface of the intermediate transfer belt 53 serving as a second image carrier. In contrast, untransferred toner remaining on the photoconductor drum 61 from which the toner image is transferred to the intermediate transfer belt 53 is scraped off by the cleaner unit 64 to be removed from the photoconductor drum 61.

When the leading end of the paper P2 conveyed to the main conveyance path R0 is detected on the basis of the signal from the paper sensor 500, a detection result is provided to the transfer control unit 115. As a result, the transfer control unit 115 recognizes that the paper P2 reaches the skew correction roller 84. The transfer control unit 115 operates the skew correction roller 84 in accordance with a timing at which the toner image is transferred to the intermediate transfer belt 53. At that time, when the intermediate transfer belt 53 is rotated by the driving roller 55 and the driven roller 56, the toner image transferred to the intermediate transfer belt 53 moves to a transfer position abutting the secondary transfer roller 57, and is transferred to the paper P2 conveyed to the transfer position on the main conveyance path R0. Untransferred toner remaining on the intermediate transfer belt 53 from which the toner image is transferred to the paper P2 is scraped off by the cleaner unit 58 to be removed from the intermediate transfer belt 53.

The paper P2 to which the toner image is transferred at an abutting position with the secondary transfer roller 57 is conveyed to the fixing unit 6 by the heating roller 59 and the pressurizing roller 60. At that time, the CPU 101 drives and controls the fixing unit 6 via the fixing control unit 116 in order to fix the toner image on the paper P2 conveyed to the fixing unit 6. That is, the fixing control unit 116 controls the rotational operation of the heating roller 59 and the pressurizing roller 60 and controls a heating operation of the heating roller 59 at the same time.

As a result, when the paper P2 on which the unfixed toner image is placed passes through a fixing nip portion of the fixing unit 6, this is heated by the heating roller 59 and pressurized by the pressurizing roller 60, and the unfixed toner image is fixed on a paper surface. After the toner image is fixed (after printing on one surface), the paper P2 is conveyed to the paper ejection roller pair 91, and then ejected to the paper ejection tray 7 by the paper ejection roller pair 91. At that time, the paper ejection sensor 90 detects the rear end of the paper P2, and a detection result is provided to the main body control unit 10. As a result, the main body control unit 10 confirms that the paper P2 is normally ejected to the paper ejection tray 7.

<4. Configuration of Paper Sensor 500>

Figure 4:
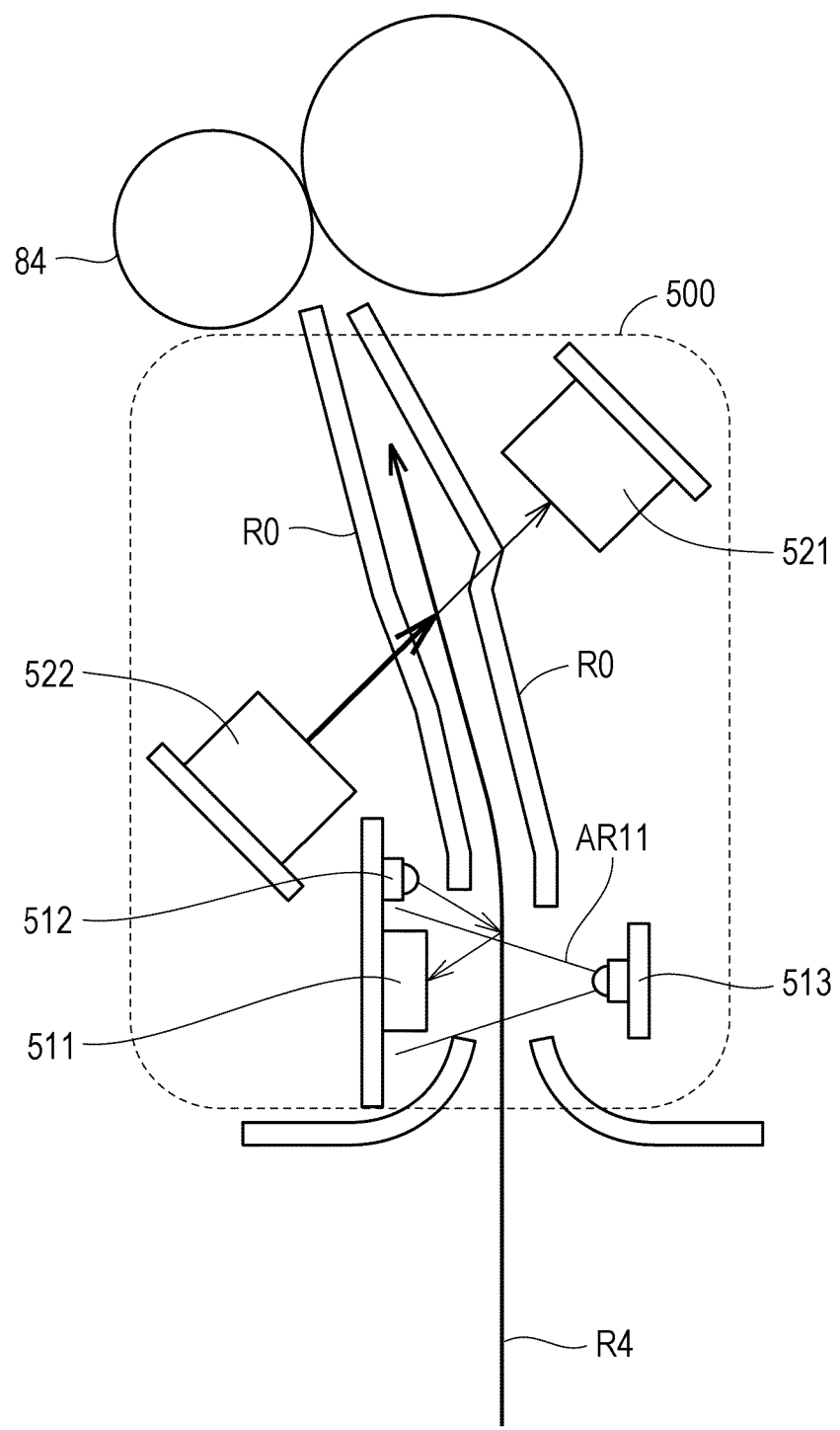
FIG. 4 is a diagram for illustrating a configuration of a paper sensor.

FIG. 4 is a diagram for illustrating a configuration of the paper sensor 500. In FIG. 4, arrow R4 indicates a conveyance direction of the paper P2 on the main conveyance path R0. The paper sensor 500 includes an optical detection unit that outputs a signal on the basis of optical detection and an ultrasonic detection unit that outputs a signal on the basis of detection using an ultrasonic wave.

(Optical Detection Unit)

Figure 5:
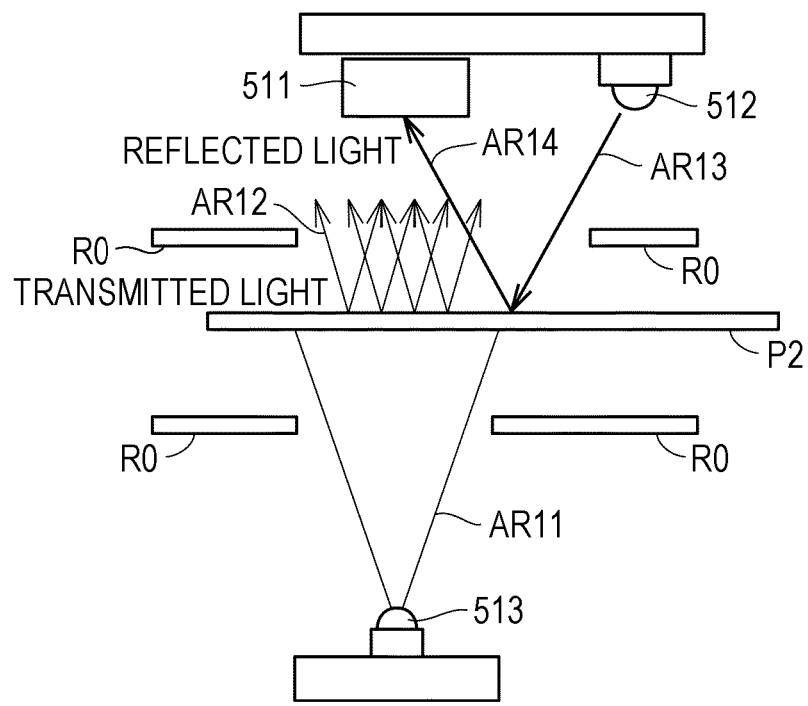
FIG. 5 is an enlarged view of an optical detection unit in the paper sensor.

FIG. 5 is an enlarged view of the optical detection unit in the paper sensor 500. The optical detection unit includes a light receiver 511 and light sources 512 and 513. The light receiver 511 includes, for example, a charge coupled device (CCD) sensor. The light sources 512 and 513 include, for example, a light emitting diode (LED) element.

With reference to the main conveyance path R0, the light source 512 is arranged on the same side as the light receiver 511. In FIG. 5, arrow AR13 indicates light emitted by the light source 512, and arrow AR14 indicates light reflected on the paper P2 and directed toward the light receiver 511 out of the light indicated by arrow AR13. The light receiver 511 detects the light output from the light source 512 and reflected on the paper P2 on the main conveyance path R0.

With reference to the main conveyance path R0, the light source 513 is arranged on the opposite side of the light receiver 511. In FIG. 5, an area AR11 indicates light emitted by the light source 513, and arrow AR12 indicates light transmitted through the paper P2 and directed toward the light receiver 511 out of the light indicated as the area AR11. The light receiver 511 detects the light output from the light source 513 and reaches the light receiver 511 through the main conveyance path R0. In a case where there is the paper P2 between the light receiver 511 and the light source 513, the light receiver 511 detects the light output from the light source 513 and transmitted through the paper P2.

The light receiver 511 outputs, to the CPU 101, a signal indicating a result of detecting the light from the light source 512 and/or the light source 513 (a signal according to an amount of light received by the light receiver 511). The CPU 101 specifies a timing at which the leading end of the paper P2 reaches the inside of the paper sensor 500 on the basis of the signal from the light receiver 511, detects a basis weight of the paper P2 in the paper sensor 500, and detects that the paper P2 in the paper sensor 500 is a sheet of a specific type (for example, a transparent sheet for overhead projector (OHP)).

In this specification, an operation for detecting the leading end of the paper P2 by the optical detection unit is referred to as a "first operation", and an operation for detecting the basis weight of the paper P2 and/or detecting that this is the sheet of a specific type is referred to as a "second operation".

(Ultrasonic Detection Unit)

Figure 6:
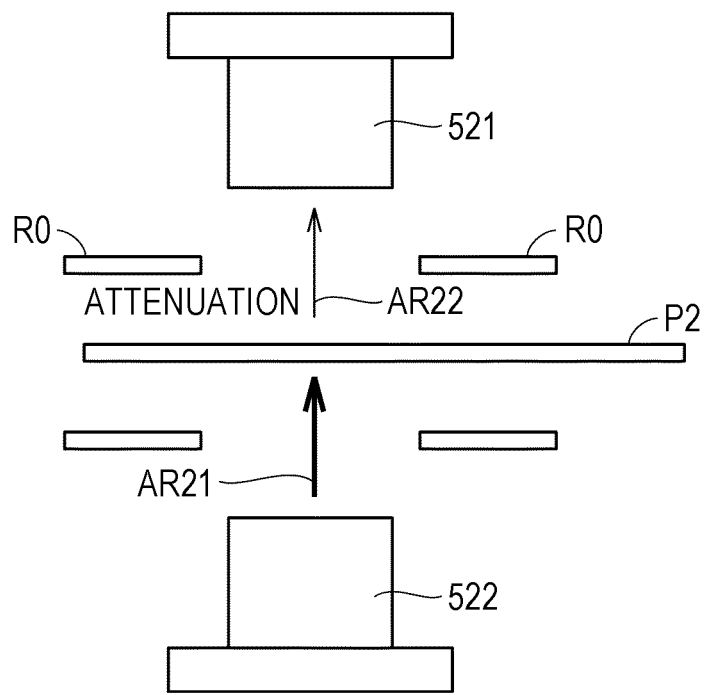
FIG. 6 is an enlarged view of an ultrasonic detection unit in the paper sensor.

FIG. 6 is an enlarged view of the ultrasonic detection unit in the paper sensor 500. The ultrasonic detection unit includes a transmitter 522 that transmits an ultrasonic wave. The ultrasonic detection unit also includes a receiver 521 that receives the ultrasonic wave and outputs a signal corresponding to intensity of the received ultrasonic wave.

In FIG. 6, arrow AR21 indicates an ultrasonic wave output from the transmitter 522. Arrow AR22 indicates an ultrasonic wave obtained by attenuating the ultrasonic wave indicated by arrow AR21 by the paper P2. The receiver 521 detects the ultrasonic wave output from the transmitter 522. In a case where there is the paper P2 between the receiver 521 and the transmitter 522, the receiver 521 detects the ultrasonic wave transmitted by the transmitter 522 and then attenuated by the paper P2.

The receiver 521 outputs a signal according to intensity of the detected ultrasonic wave to the CPU 101. On the basis of the signal from the receiver 521, the CPU 101 detects that the leading end of the paper P2 is present between the receiver 521 and the transmitter 522, and detects a type (envelope, recording paper in a state in which two or more sheets are overlapped and the like) of the paper P2.

That is, in this embodiment, each of the optical detection unit and the ultrasonic detection unit may execute the operation for detecting the leading end of the paper P2 and the detection of the basis weight and the like of the paper P2 for detecting the type of the paper P2.

As illustrated in FIG. 4 and the like, the MFP 1 may be provided with both the optical detection unit and the ultrasonic detection unit, or may be provided with only one of them.

In FIG. 4, the optical detection unit is provided upstream of the ultrasonic detection unit on the conveyance route of the paper P2. Note that the ultrasonic detection unit may be provided upstream of the optical detection unit.

The CPU 101 may detect the leading end of the paper P2 in the paper sensor 500 using a signal from any one of the optical detection unit and the ultrasonic detection unit, and may detect the type of the paper P2 using a signal from the other one. In this case, the CPU 101 may detect the leading end of the paper P2 using the detection unit on the downstream side, and detect the type of the paper P2 using the detection unit on the upstream side according to the detection of the leading end of the paper P2.

<5. Module Configuration of Image Forming Apparatus>

Figure 7:
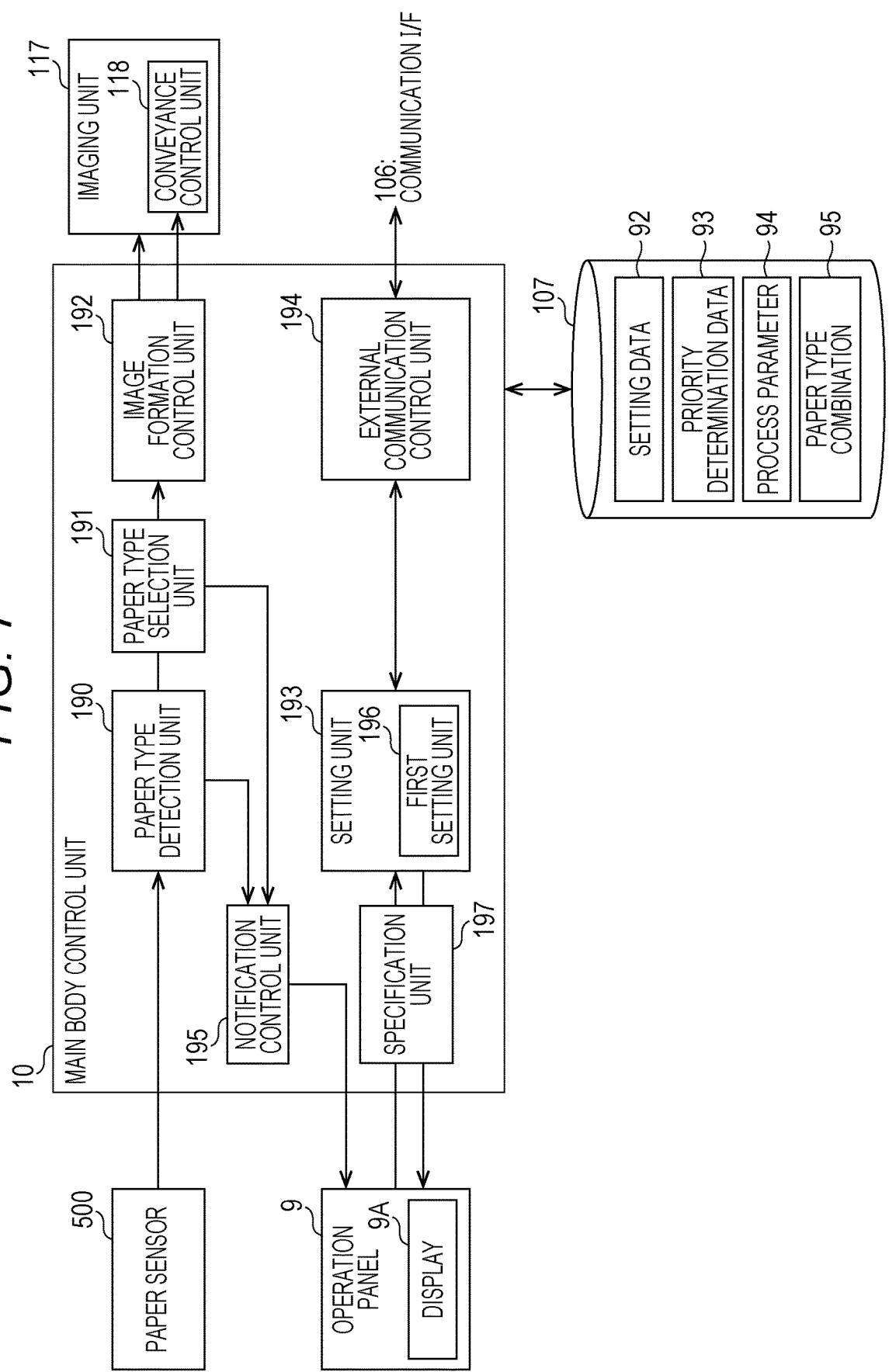
FIG. 7 is a diagram illustrating an example of a module configuration of the MFP.

FIG. 7 is a diagram illustrating an example of a module configuration of the MFP 1.

As illustrated in FIG. 7, in this embodiment, the main body control unit 10 of the MFP 1 may implement one or more modules corresponding to a paper type detection unit 190, a paper type selection unit 191, an image formation control unit 192, a setting unit 193 including a first setting unit 196, an external communication control unit 194 that controls communication with the terminal 200 or 300 via the communication I/F 106, a notification control unit 195, and a specification unit 197 by the CPU 101 executing a program. Some of these modules may be implemented by a combination of a program and a circuit.

The paper type detection unit 190 acquires data indicating the type of the paper P2 conveyed on the conveyance path on the basis of the detection signal from the paper sensor 500. More specifically, the paper type detection unit 190 compares the basis weight of the paper P2 specified on the basis of the signal from the paper sensor 500 with a threshold, and detects, for example, "thin paper", "plain paper", "thick paper", "envelope", "recycled paper" and the like as the paper type on the basis of a result of the comparison, but the detectable paper type is not limited thereto.

In the "different type case", the paper type selection unit 191 determines the "selected type" out of the "detected type" and the "specified type" on the basis of setting data 92 and priority determination data 93 to be described later, and outputs the determined "selected type" to the image formation control unit 192 and the notification control unit 195.

The image formation control unit 192 controls each unit of the imaging unit 117 to form an image on the paper P2 conveyed through the conveyance path in the MFP 1 according to a job 50. The image formation control unit 192 normally controls an operation of each unit of the imaging unit 117 according to the job 50 so that the image is formed on the paper P2 of a paper type 554 of the job 50 to be described later. In the "different type case", the image formation control unit 192 controls the operation of each unit of the imaging unit 117 according to the job 50 so that the image is formed on the paper P2 of the "selected type" from the paper type selection unit 191. In the "different type case", the image formation control unit 192 controls each unit of the imaging unit 117 according to a process parameter 94 to be described later. At that time, the image formation control unit 192 may also specify the paper feed tray that stores the paper P2 corresponding to the "selected type" out of the paper feed trays capable of supplying the paper P2 to the conveyance path, and control to switch the paper feed tray for supply to the specified paper feed tray.

The setting unit 193 acquires a user setting regarding the image formation from the user operation received via the operation panel 9. The setting unit 193 stores the acquired user setting as the setting data 92 to be described later. The setting unit 193 may also acquire the user setting on the basis of the data received by the external communication control unit 194 from the terminal 200 or 300. The first setting unit 196 of the setting unit 193 individually sets data for the paper feed tray in the setting data 92 for each paper feed tray.

The notification control unit 195 outputs a notification based on the "selected type" from the paper type selection unit 191 to the operation panel 9 in the "different type case". The operation panel 9 allows the display 9A to output the notification from the notification control unit 195 as an image in order to present the notification to the user. In this embodiment, the notification from the notification control unit 195 is not limited to a visual notification via the display 9A, and may be audibly issued as a sound by a speaker not illustrated. The notification control unit 195 may transfer the notification to the terminal 200 or 300 of the user via the external communication control unit 194, and allow these terminals to output visually or audibly. For example, the portable terminal 300 may further vibrate the terminal 300 itself to notify the user of the received notification.

For each paper feed tray, the specification unit 197 receives specification of the type of sheet to be stored in the paper feed tray from the user via the operation panel 9, for example. The specification unit 197 outputs the received information to the setting unit 193.

<6. Job>

Figure 8:
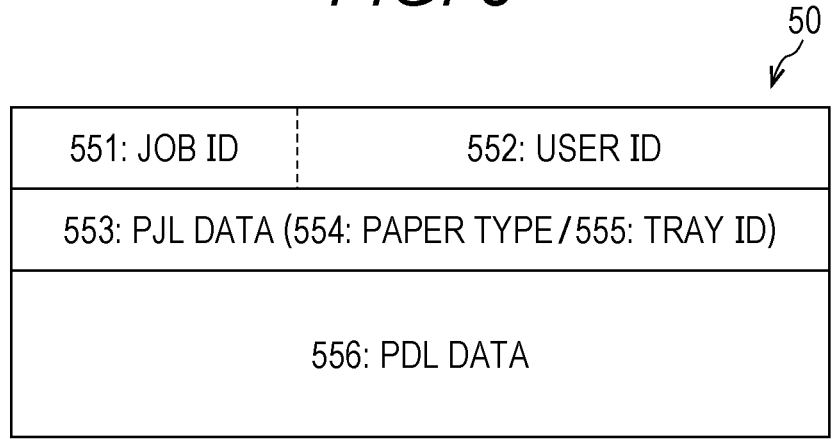
FIG. 8 is a diagram schematically illustrating an example of a configuration of a job according to this embodiment.

FIG. 8 is a diagram schematically illustrating an example of a configuration of the job 50 according to this embodiment. The job 50 is a print job as an example. The job 50 includes a job identifier (ID) 551 for identifying the job, a user ID 552 for identifying a user of the job, and printer job language (PJL) data 553 and page description language (PDL) data 556 for allowing the image forming apparatus to execute image forming processing. The PJL data 553 is command data that does not directly affect the PDL data 556, and includes, for example, the paper type 554 specified for printing, a tray ID 555 specifying the paper feed tray that supplies paper to the conveyance path and the like in addition to commands regarding control such as stapling and punching.

The image processing unit 104 expands the PDL data 556 of the job 50 as bitmap data on a RAM of a storage unit 160. The imaging unit 117 executes printing processing of each color on the paper P2 according to the bitmap data (PDL data 556) expanded by the image processing unit 104. The image processing unit 104 also expands the image data read from the original by the image reading unit 3 as the bitmap data, and the imaging unit 117 executes printing processing of each color on the paper P2 according to the bitmap data expanded for the original.

The specification unit 197 may acquire the paper type 554 from the job 50 of the user, acquire the acquired paper type 554 as the specified type of the user, and output the same to each unit. The specification unit 197 may acquire the tray ID 555 from the job 50 of the user, search the setting data 92 for a paper type 923 associated with a tray ID 922 that matches the acquired tray ID 555, and output the searched paper type 923 to each unit as the specified type of the user. In this manner, the specification unit 197 may acquire the specified type of the user from the paper type 554 or the tray ID 555 of the job 50 in addition to the operation panel 9.

<7. Information of HDD and Operation of Each Unit>

Figure 9:
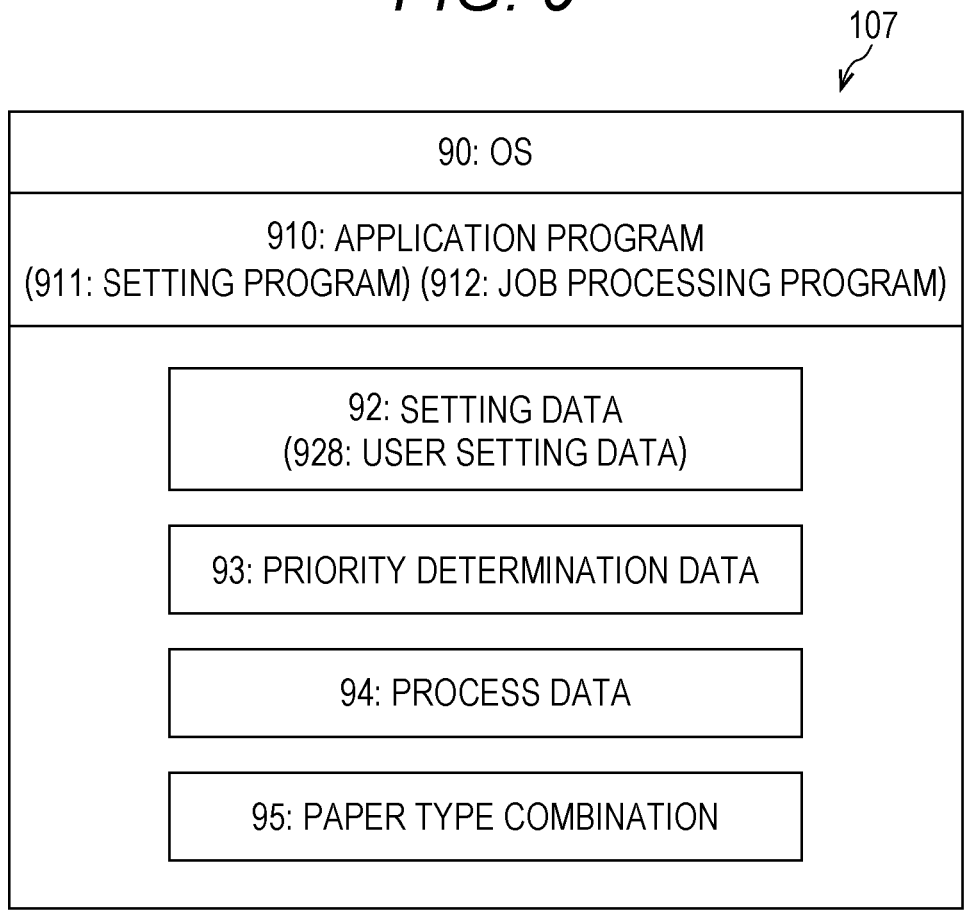
FIG. 9 is a diagram schematically illustrating an example of information stored in a HDD according to this embodiment.
Figure 10:
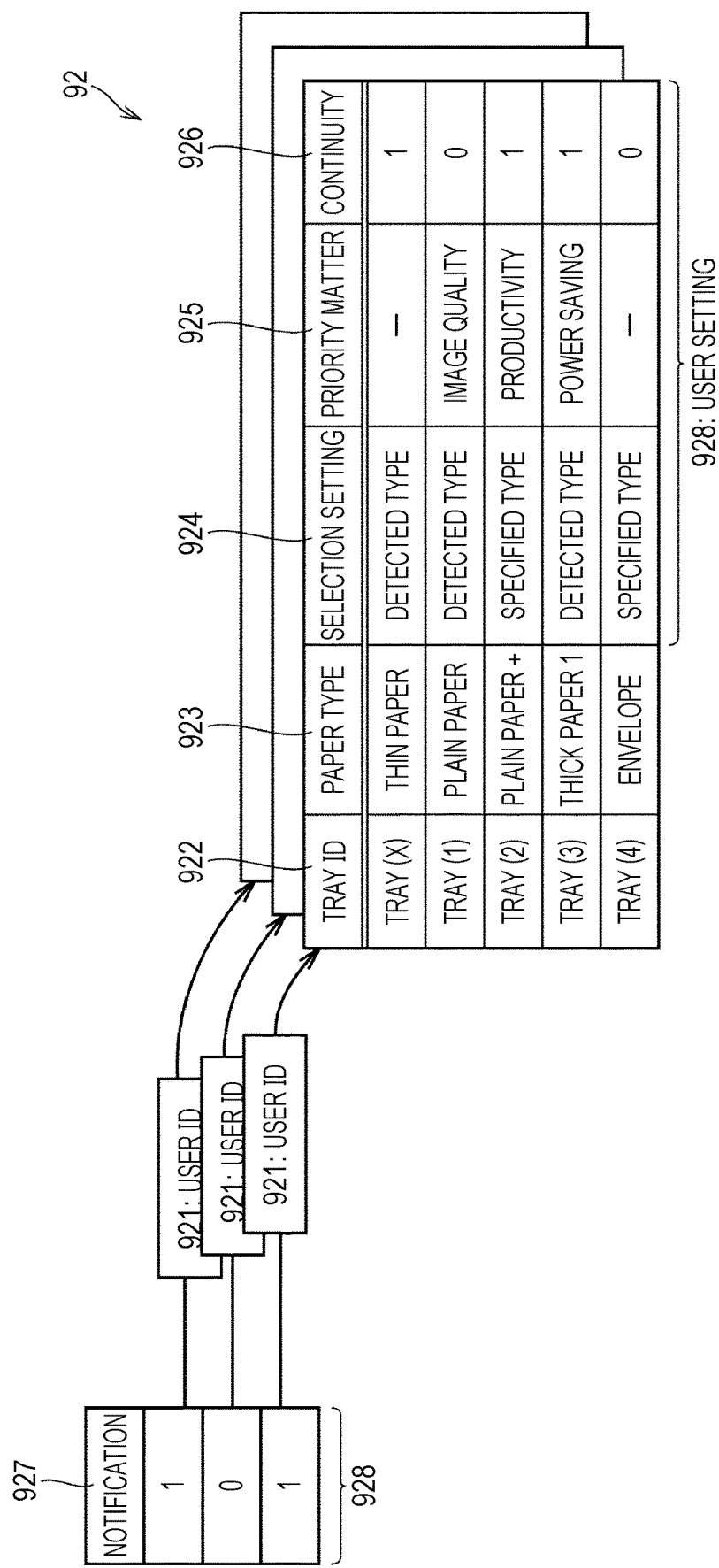
FIG. 10 is a diagram illustrating an example of setting data according to this embodiment.
Figure 12:
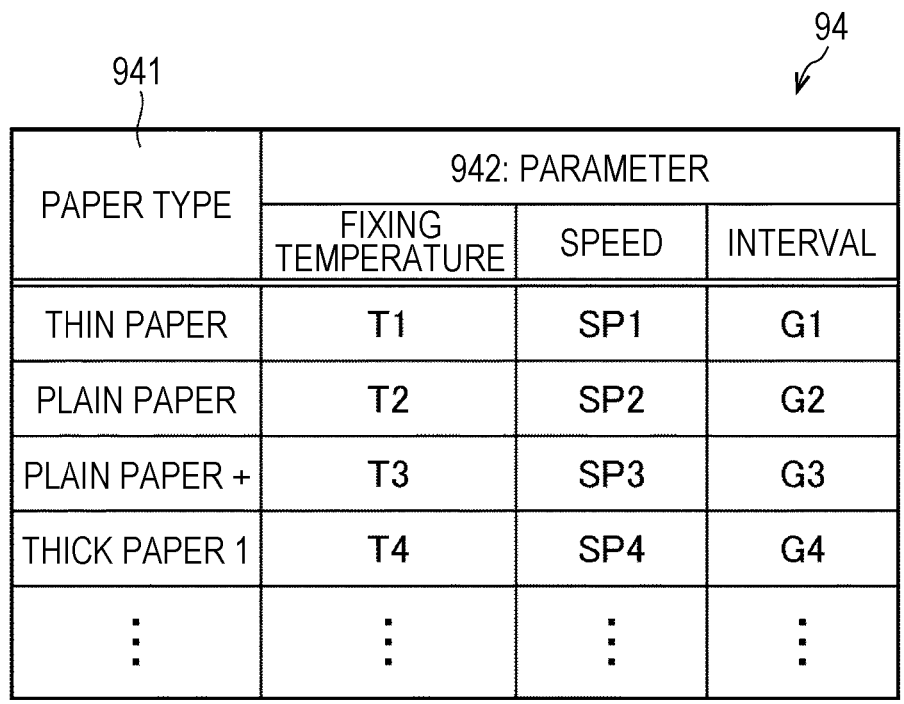
FIG. 12 is a diagram illustrating an example of a process parameter according to this embodiment.
Figure 13:
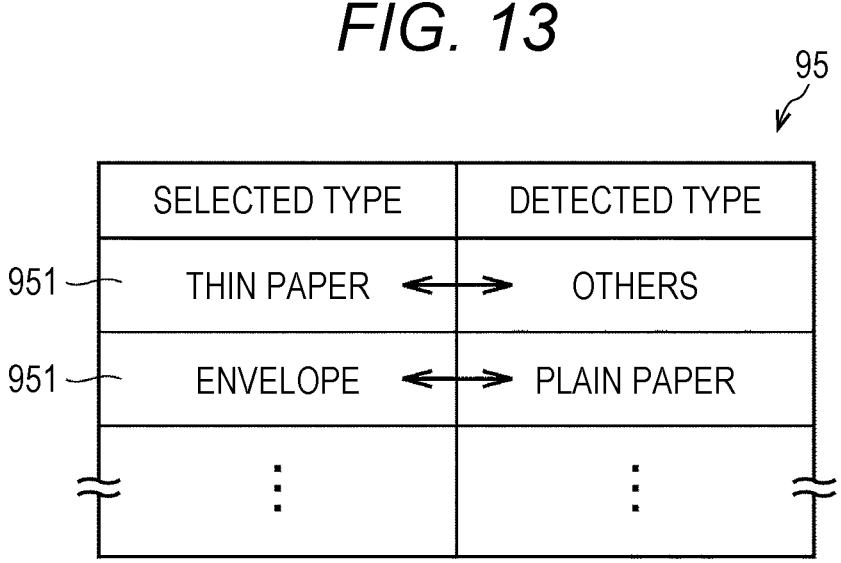
FIG. 13 is a diagram illustrating an example of a paper type combination according to this embodiment.

FIG. 9 is a diagram schematically illustrating an example of information stored in the HDD 107 according to this embodiment. FIG. 10 is a diagram illustrating an example of the setting data 92 according to this embodiment. FIG. 11 is a diagram illustrating an example of the priority determination data 93 according to this embodiment. FIG. 12 is a diagram illustrating an example of the process parameter 94 according to this embodiment. FIG. 13 is a diagram illustrating an example of a paper type combination 95 according to this embodiment.

With reference to FIG. 9, the HDD 107 stores a system program including an operating system (OS) 90 and an application program 910, and stores various data. The application program 910 includes a program that implements various modules of the main body control unit 10 in FIG. 7 together with a control program that controls the MFP 1. FIG. 7 illustrates, for example, a setting program 911 and a job processing program 912 that implement modules of the setting unit 193 and the image formation control unit 192, respectively, out of the modules of the main body control unit 10, but the programs are not limited to these programs.

The data stored in the HDD 107 includes the setting data 92 in FIG. 10, the priority determination data 93 in FIG. 11, the process parameter 94 in FIG. 12, and the paper type combination 95 in FIG. 13.

With reference to FIG. 10, the setting data 92 includes a user ID 921 and data associated with the user ID 921 for each user. The data associated with the user ID 921 includes, for one or a plurality of paper feed trays, the tray ID 922 for identifying the paper feed tray, the paper type 923 of paper stored in the paper feed tray, a selection setting 924, a priority matter 925, and continuity 926. In this embodiment, since the user may store the paper in each tray, the user may set the paper type 923 of the paper stored in each tray. In FIG. 10, data is set for each of one or a plurality of paper feed trays included in the MFP 1. The paper type 923 includes, for example, (thin paper, plain paper, plain paper+, thick paper 1, and envelope), but is not limited thereto, and may include, for example, recycled paper. The setting data 92 includes a notification 927 in association with the user ID 921.

The selection setting 924 indicates selective specification as to with which paper type of "detected type" or "specified type" the image formation is continuously performed in the "different type case". The continuity 926 indicates, by a value of 1 or 0, specification as to whether the corresponding selection setting 924 is to be applied to only one printing (for example, execution of one job 50) or to all the printing of the job 50 of the user, that is, to a plurality of jobs (that is, to be continuously applied).

The priority matter 925 indicates a matter that should be determined in order to specify one of the "detected type" and the "specified type" in preference to the other as the paper type of the paper for continuously performing the image formation in the "different type case". The priority matter 925 includes, for example, but is not limited to, an image quality, productivity, power saving and the like.

In a case where the priority matter 925 indicates "image quality" in the "different type case", the paper type selection unit 191 selects the paper type with which it is determined that image formation with better image quality may be implemented. In a case where the priority matter 925 indicates "productivity", the paper type with which it is determined that the number of sheets of paper to be printed per unit time is larger is selected. In a case where "power saving" is indicated, the paper type with which power consumption in image formation is lower is selected. In this embodiment, the "image quality" is based on a current value of a transfer current supplied to the photoconductor drum 61 for transfer or fixing temperature being heating temperature of the heating roller 59 of the fixing unit 6. The "productivity" is based on a system speed being a speed at which the paper P2 is conveyed or a paper interval indicating an interval at which the paper P2 is conveyed. The "power saving" is based on the amount of power consumed in each unit in the image formation.

With reference to FIG. 11, the priority determination data 93 includes a plurality of items 931 used for determining the priority and priority 932 between the paper types in association with each of the items 931. The item 931 includes, for example, productivity at the time of image formation, image quality, and power saving. In FIG. 11, the priority order of the productivity is as follows in descending order: thin paper>plain paper (ECO)>plain paper>thick paper 1>thick paper 2>thick paper 3>thick paper 4. The priority order of the image quality is higher in the "detected type" with all the paper types. The priority order of the power saving is as follows in descending order: thin paper>plain paper (ECO)>plain paper>thick paper 1>thick paper 2>thick paper 3>thick paper 4. The ordering is an example. Plain paper (ECO) in FIG. 11 indicates recycled paper.

In the MFP 1, since the fixing temperature is lower and the conveyance speed is lower in the image formation on the thin paper than on the plain paper, and the fixing temperature is lower and the conveyance speed is lower in the image formation on the plain paper than on the thick paper, with reference to FIG. 11, the power consumption is lower in the image formation on the thin paper than on the plain paper, and the power consumption is lower in the image formation on the plain paper than on the thick paper.

In the "different type case", the paper type selection unit 191 specifies the setting data 92 associated with the user ID 921 that matches the user ID 552 of the job 50. In the specified setting data 92, items indicated by the priority matter 925 corresponding to the paper type 923 that matches the paper type 554 of the job 50 are specified. On the basis of the specified matter, the paper type selection unit 191 searches the priority determination data 93 for the priority 932 between the paper types associated with the item 931 that matches the matter. The paper type selection unit 191 compares the priority order of the "detected type" and the "specified type" in the searched priority 932 between the paper types, and determines one with higher order as the "selected type". For example, in a case where the priority matter 925 of the specified item indicates productivity, according to FIG. 11, when the "detected type" and the "selected type" are plain paper and thick paper 1, the paper type selection unit 191 selects the "detected type" with higher productivity and outputs the "selected type" indicating plain paper. In a case where the priority matter 925 corresponding to the paper type 923 that matches the paper type 554 of the job 50 indicates "-", the paper type selection unit 191 outputs the paper type indicated by the corresponding selection setting 924 as the "selected type".

The notification 927 specifies whether to output the notification to the user with a value of 1 or 0 in the "different type case". More specifically, in order to continuously perform the image formation, in a case where the "selected type" is different from the "detected type" and the "selected type" is far from the "detected type", the notification 927 indicates whether to output the notification to the user by a value of 1 or 0. A degree to which the "selected type" is far from the "detected type" is represented by a deviation degree. An example of the deviation degree with which the notification should be output is indicated by the paper type combination 95 in FIG. 13.

With reference to FIG. 13, for example, (thin paper and other paper types) and (envelope and plain paper) are indicated as a set 951 of (selected type and detected type) corresponding to the deviation degree with which the notification should be output. Therefore, in the "different type case" at the time of image formation based on the job 50, in a case where the notification 927 set by the user of the job 50 indicates "1", the notification control unit 195 searches for the paper type combination 95 on the basis of a combination of the "selected type" from the paper type selection unit 191 and the "detected type" from the paper type detection unit 190, and when it is determined that the search result indicates that the combination corresponds to any set 951, the notification control unit 195 outputs the notification.

With reference to FIG. 12, the process parameter 94 includes a plurality of paper types 941 and parameters 942 regarding a process of the image formation in association with each paper type 941. The parameters 942 include, for example, the fixing temperature, the conveyance speed, and the paper interval at the time of conveyance, but types of the parameters are not limited thereto. In a case where an image is formed on the paper of the "specified type" or the "selected type", the image formation control unit 192 searches the process parameter 94 for the parameter 942 associated with the paper type 941 that matches the type of the paper, and controls each unit of the imaging unit 117 in accordance with the searched parameter 942.

With reference to FIG. 10, the selection setting 924, the priority matter 925, the continuity 926, and the notification 927 form user setting data 928 for allowing the imaging unit 117 to continuously perform the image formation (printing) in the "different type case".

In this embodiment, the setting unit 193 receives the setting data 92 of the user illustrated in FIG. 10 regarding the image formation. The first setting unit 196 included in the setting unit 193 receives setting including the selection setting 924, the priority matter 925, and the continuity 926 of the user setting data 928 for each paper feed tray.

<8. Case of Outputting Notification>

In this embodiment, the set 951 includes, for example, a combination that might be a disadvantage of the user or a defect of a machine of the MFP 1 when the image formation is continuously performed due to a large deviation degree of the paper type. For example, a combination that might cause a deterioration in image quality, a reduction in productivity such as the number of sheets of paper to be printed per unit time and the like is included.

For example, in a case where the user stores, in the paper feed tray in which thick paper is stored, thin paper on the thick paper, the paper type 554 of the job 50 of the user indicates thin paper, so that the MFP 1 performs printing with the process parameter for the thin paper. When the thin paper in the paper feed tray runs out during printing and the thick paper is supplied from the paper feed tray to the conveyance path, that is, when the "different type case" is detected, printing is performed on the thick paper with the process parameter for thin paper. In this case, since the combination of (thin paper and thick paper) corresponds to the set 951, there is a possibility that a fixing failure of toner to the thick paper occurs and the toner on the thick paper peels off inside and outside the machine, resulting in a defect of the MFP 1. When the thick paper runs out during the printing and the thin paper is supplied to the conveyance path, printing is performed on the thin paper with the process parameter of the thick paper, and there is a possibility that a defect such as fixing winding of the printing paper occurs. In this embodiment, when the "different type case" in which such defect is likely to occur is detected, the notification is output to the user, so that it is possible to urge the user to cope with or prevent the defect. In this embodiment, in such "different type case", the printing may be continuously performed by dynamically changing the process parameter to the process parameter adapted to the paper type of the detected type. This makes it possible to avoid the above-described defect. Alternatively, the image formation control unit 192 may be configured to avoid the defect by switching the process parameter to the process parameter of another paper type having a smaller deviation degree from the specified type than the detected type, or by switching the paper feed tray so as to supply the paper type having the parameter close to the value of the process parameter of the specified type to the conveyance path.

<9. UI>

FIGS. 14 to 18 are diagrams illustrating an example of a UI screen according to this embodiment. The setting unit 193 allows the display 9A to display a screen for receiving a user setting operation including the paper type, and the setting unit 193 stores the setting data 92 based on the user operation on the screen.

Figure 14:
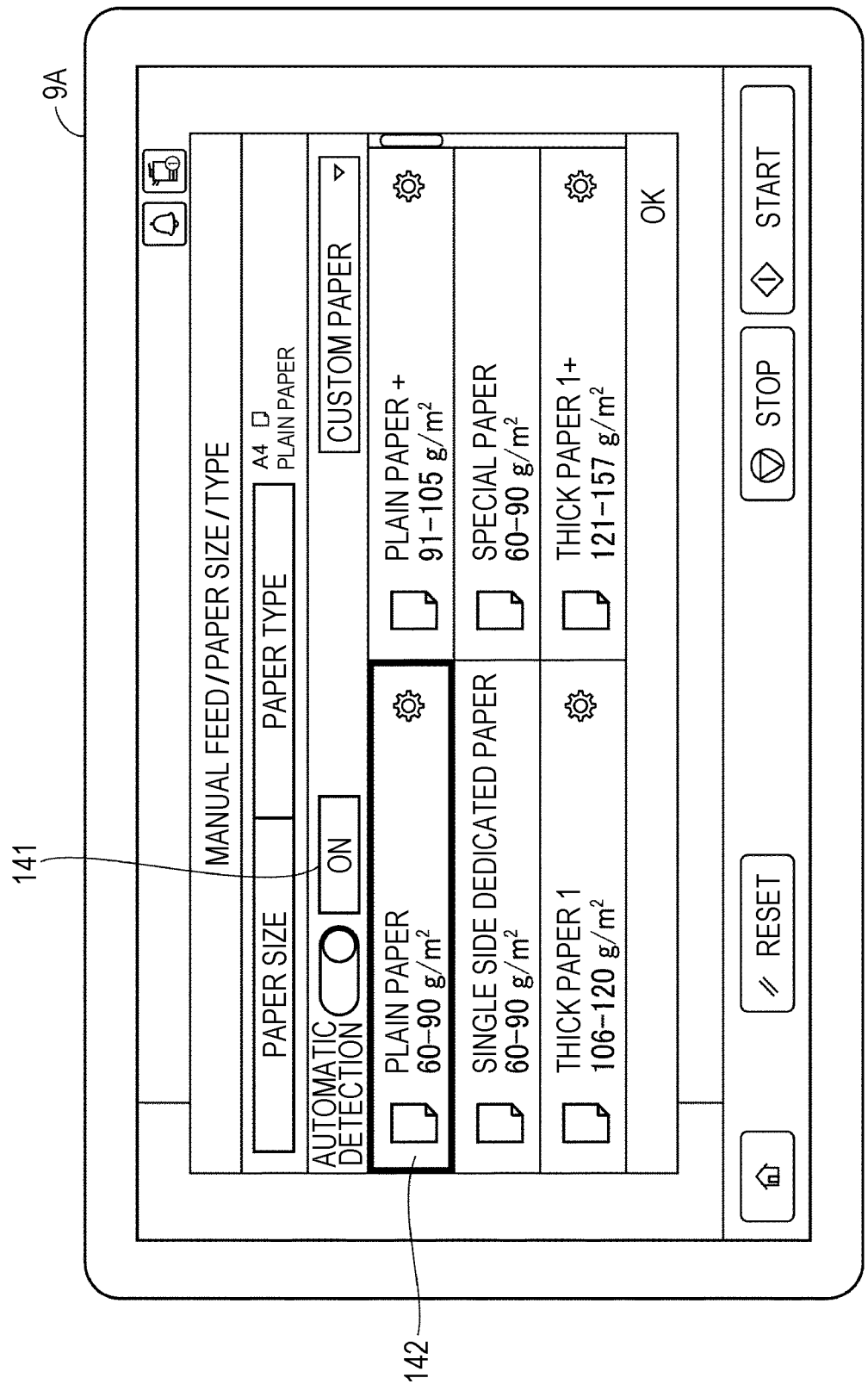
FIG. 14 is a diagram illustrating an example of a UI screen according to this embodiment.

FIG. 14 illustrates a screen for receiving the setting of the paper type 923 stored in the paper feed tray for each paper feed tray. FIG. 14 illustrates a case of setting for the manual feed tray, for example, and the user may set the paper type stored in the manual feed tray as plain paper by operating an icon 142. The user may similarly set the paper type for other paper feed trays. On the screen in FIG. 14, an icon 141 notifies the user that a mode for allowing the paper sensor 500 to detect the paper type at the time of image formation, that is, a detection mode of the "different type case" is set in the MFP 1. The MFP 1 includes a toggle switch (not illustrated) that may be operated from the outside, and when the toggle switch is operated, the paper sensor 500 is set to be able to detect the paper type, and the detection mode of the "different type case" is set in the MFP 1. Note that a method of setting the detection mode of the different type case for the MFP 1 is not limited to the operation of the toggle switch, and may be, for example, a setting from the UI screen displayed on the display 9A.

Figure 15:
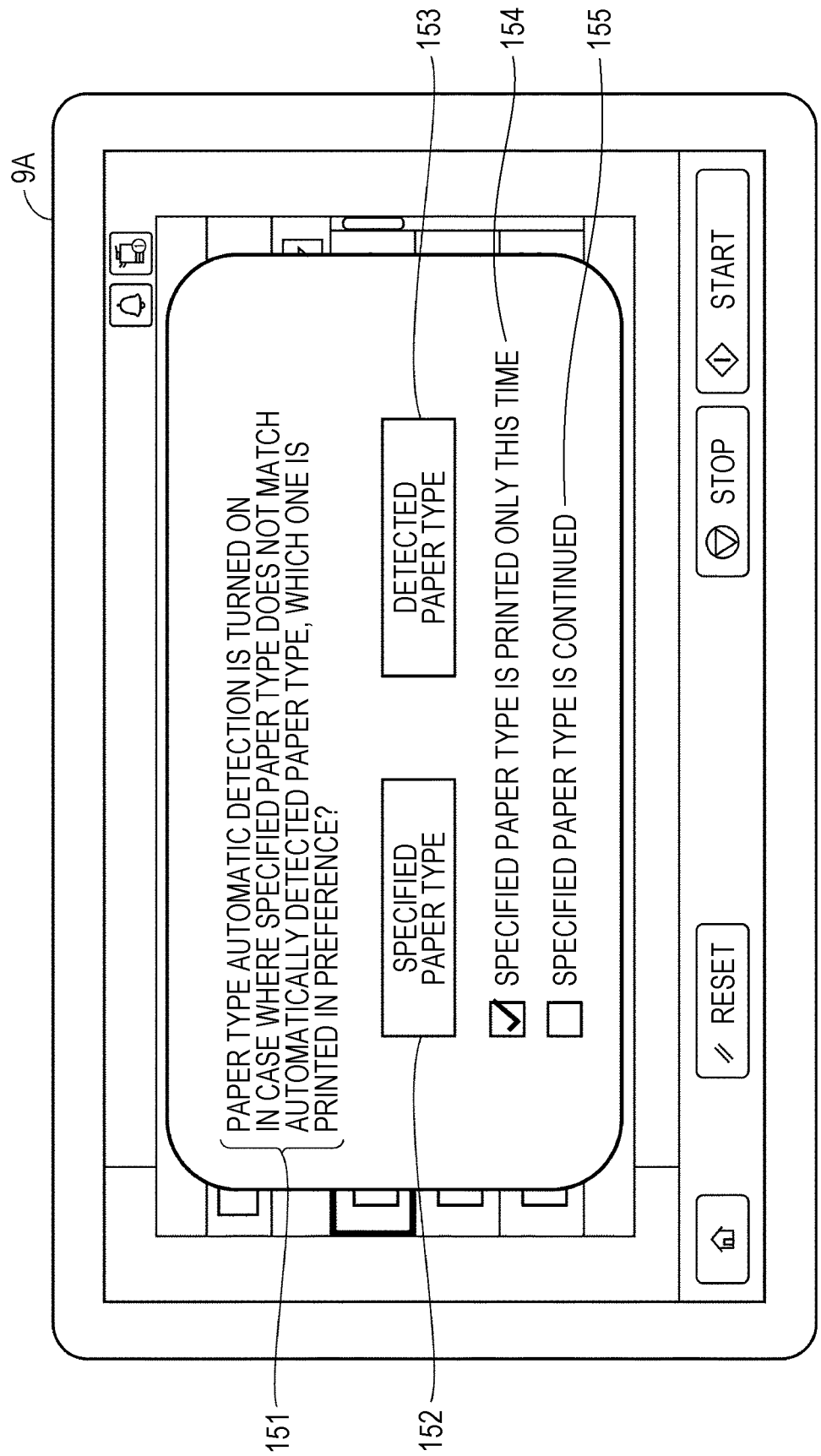
FIG. 15 is a diagram illustrating an example of a UI screen according to this embodiment.

FIG. 15 illustrates a screen for receiving the setting of the selection setting 924 and the continuity 926 for each paper feed tray. The screen in FIG. 15 is a setting screen of the manual feed tray, and includes, for example, a message 151 indicating that the detection mode of the "different type case" is set for the manual feed tray on the screen in FIG. 14, icons 152 and 153 operated for selecting either the "specified type" or the "detected type" as the selection setting 924, and icons 154 and 155 operated for setting the continuity 926. The user may similarly set as in FIG. 15 for other paper feed trays.

Figure 16:
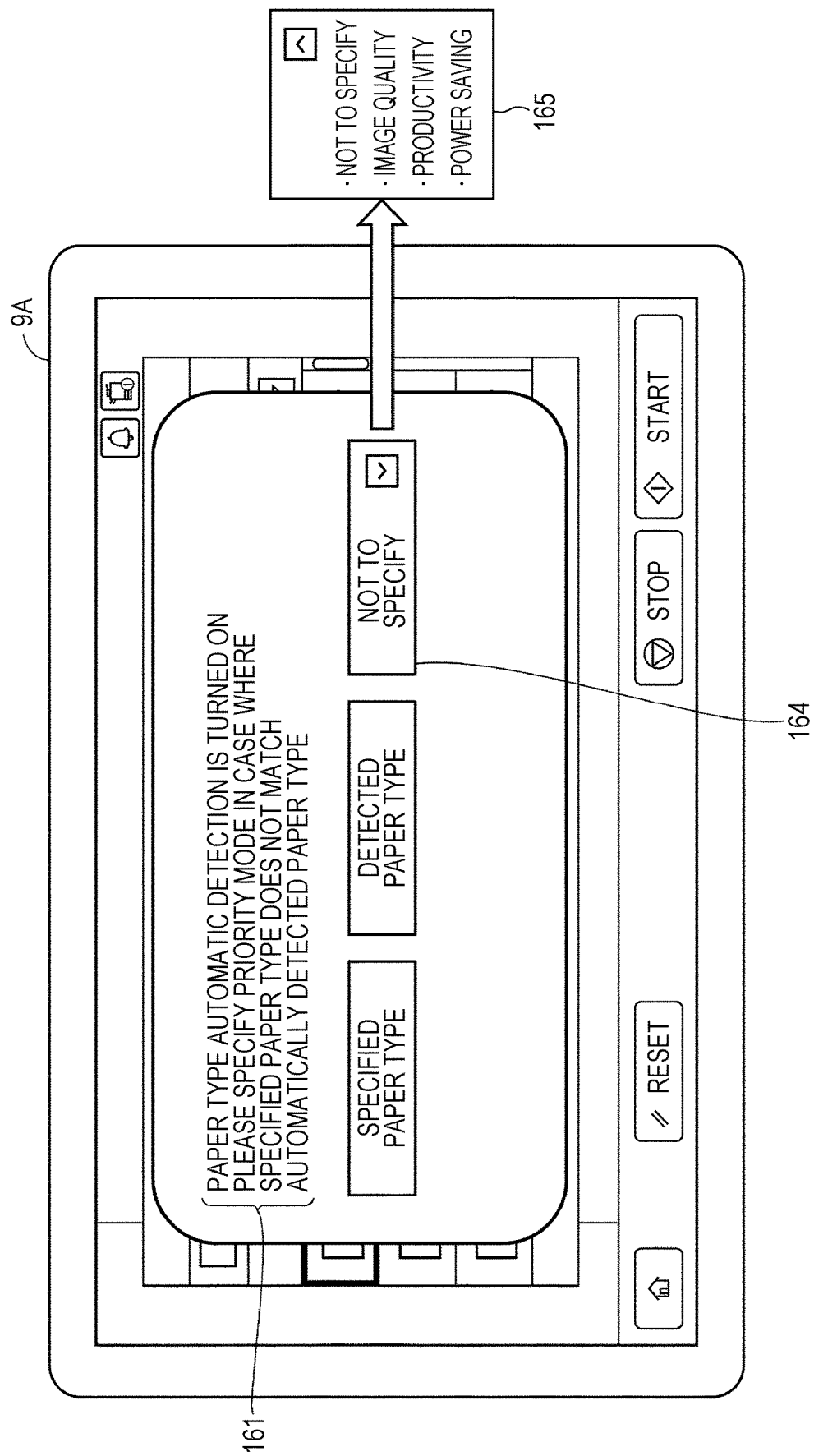
FIG. 16 is a diagram illustrating an example of a UI screen according to this embodiment.

FIG. 16 illustrates a screen for receiving the setting of the priority matter 925 for each paper feed tray. The screen in FIG. 16 is a setting screen of the manual feed tray, for example, and includes, for example, a message 161 indicating that the detection mode of the "different type case" is set for the manual feed tray on the screen in FIG. 14, an icon 164 operated for setting whether the priority matter 925 is selected, and a pull-down menu 165 indicating candidates of items that may be set. The user may similarly set as in FIG. 16 for other paper feed trays.

Figure 17:
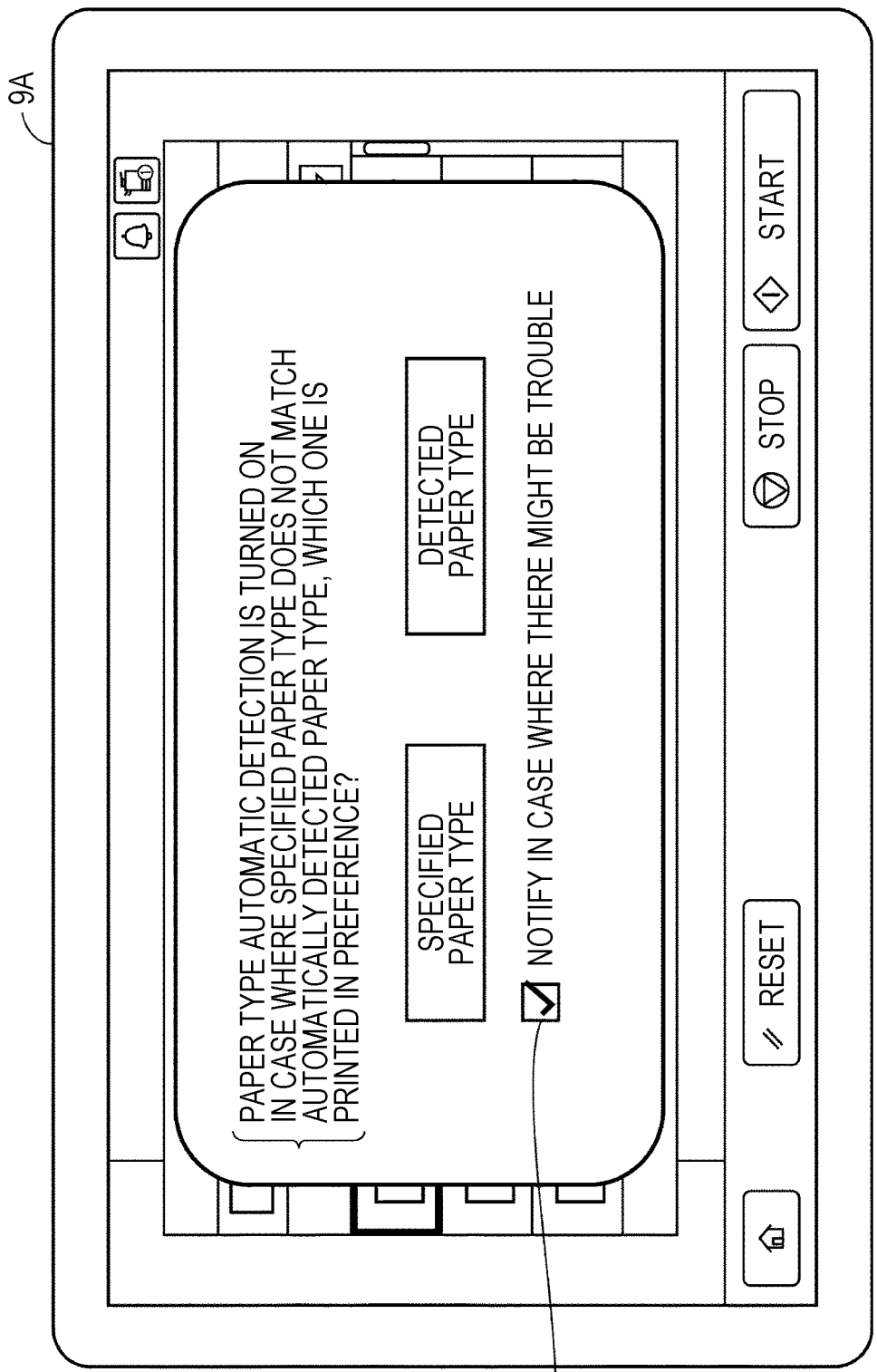
FIG. 17 is a diagram illustrating an example of a UI screen according to this embodiment.

FIG. 17 illustrates a screen for receiving a setting operation of the notification 927 from the user. The screen in FIG. 17 includes a check box 175 operated for setting the notification 927 to 1.

Figure 18:
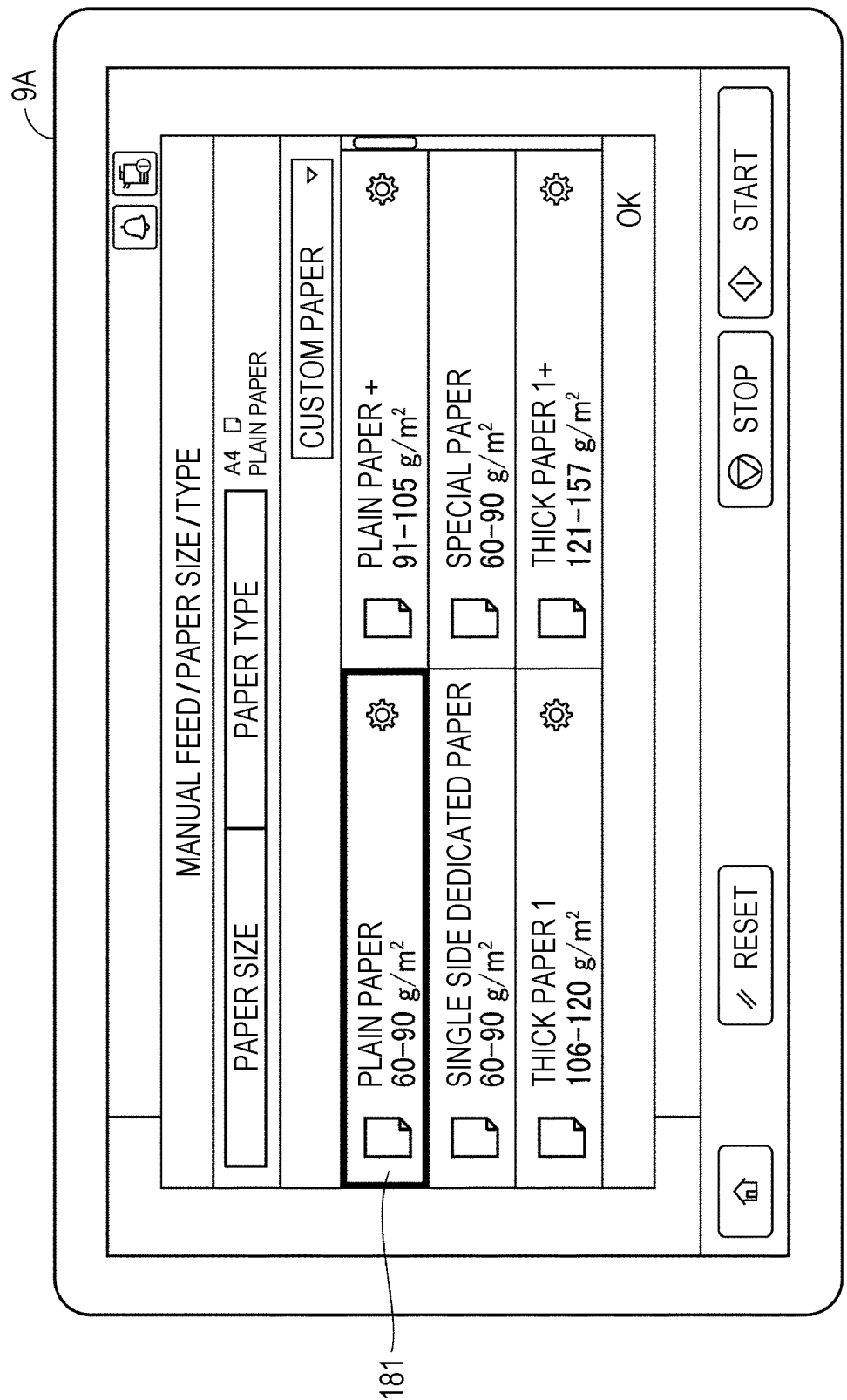
FIG. 18 is a diagram illustrating an example of a UI screen according to this embodiment.

FIG. 18 is a variation of the screen in FIG. 14, and includes an icon 181 operated for setting the paper type of the paper stored in the manual feed tray in a case where the detection mode of the "different type case" is not set. In FIG. 18, the user operates the icon 181 to set the paper type of the manual feed tray to plain paper. The user may similarly operate as in FIG. 18 to set the paper type for other trays.

In this embodiment, a time when the MFP 1 presents the UI in FIGS. 14 to 18 to the user to acquire the setting data 92 includes, for example, a time when the user sets (stores) paper in the tray, but is not limited thereto. For example, the time to set the setting data 92 is not limited as long as this may be set before printing; for example, when the user sets the paper type for the MFP 1 or when the MFP 1 is set up. The UI screens in FIGS. 14 to 18 may also be switched for each user.

<10. Flowchart of Setting>

Figure 19:
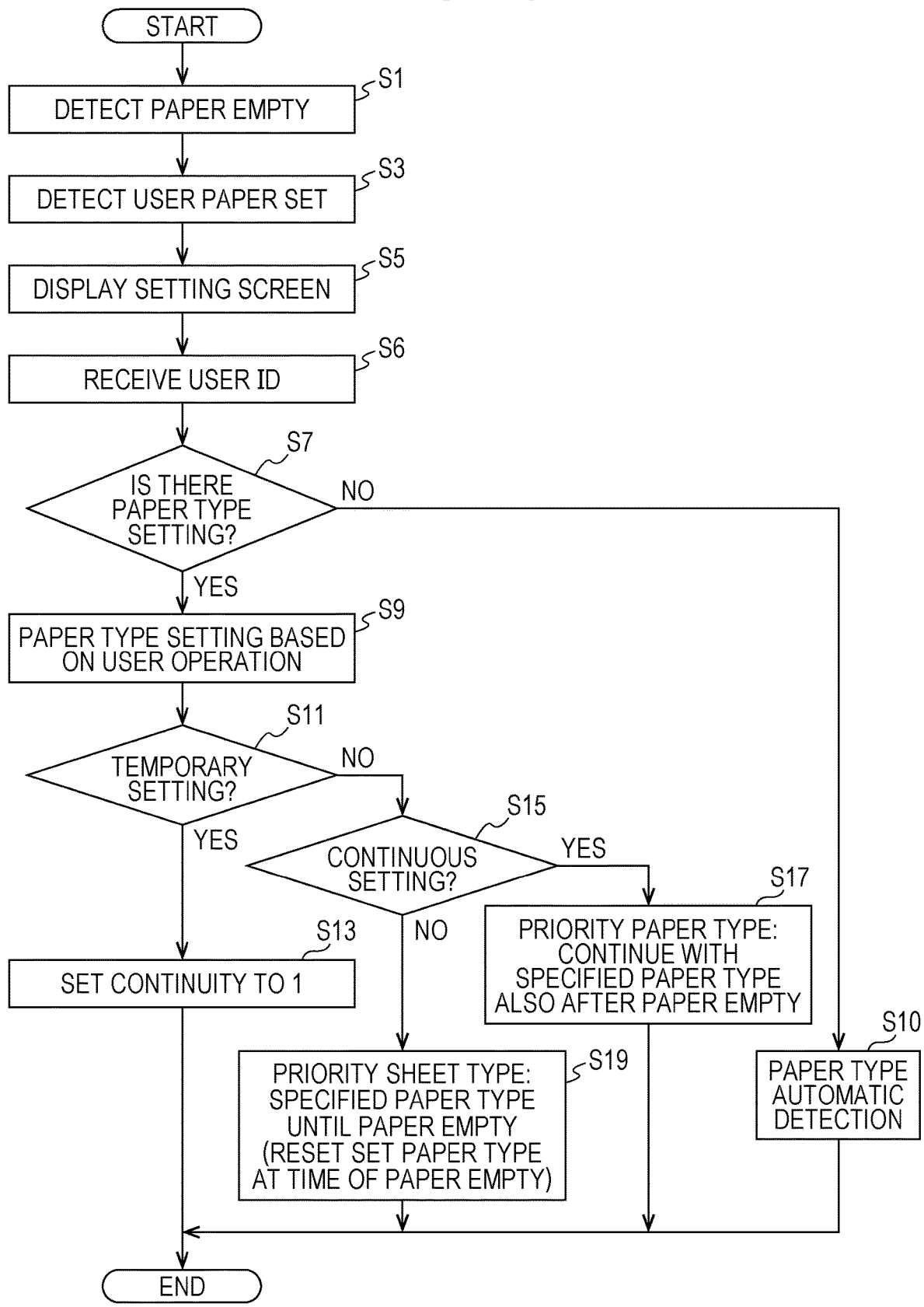
FIG. 19 is a flowchart illustrating processing of a user setting according to this embodiment.

FIG. 19 is a flowchart of processing of the user setting according to this embodiment. This processing is implemented by the CPU 101 mainly executing the setting program 911. First, at step S1 of the processing, the CPU 101 detects that the paper of the tray runs out (empty) on the basis of the signal from the sensor unit 900. At step S3, the CPU 101 detects that the paper is stored in the empty paper feed tray on the basis of the signal from the sensor unit 900. Here, for example, it is detected that the paper is stored in the manual feed tray.

At step S5, the CPU 101 displays the UI screen in FIG. 14 on the display 9A and receives the user ID (step S6). When the CPU 101 does not receive the setting operation of the paper type as the user operation on the screen in FIG. 14, that is, when the user does not perform the setting operation (NO at step S7), the CPU 101 detects the paper type stored in the manual feed tray on the basis of the signal from the sensor unit 900 (step S10). The CPU 101 sets the detected paper type as the paper type 923 of the manual feed tray.

When the user receives the setting operation on the UI screen in FIG. 14 (YES at step S7), the CPU 101 sets the paper type based on the received user operation as the paper type 923 of the manual feed tray (step S9). The CPU 101 displays the UI screen in FIG. 15 on the display 9A, and determines whether the user operation received from the UI screen is an operation on a temporary icon 154 (only printing of this time) (step S11).

When determining that the received user operation is the operation on the icon 154 (YES at step S11), the CPU 101 sets the continuity 926 of the manual feed tray to "1" (step S13). When determining that the received user operation is not the operation on the icon 154 (NO at step S11), the CPU 101 normally sets the continuity 926 to "0" as an operation on an icon 155.

In FIG. 19, as a variation, the continuity 926 may be set to "00" or "01". More specifically, the CPU 101 sets the continuity 926 to "01" (step S17) in a case where the received user operation indicates that the image formation is continued with the "specified type" indicated by the paper type 554 of the job 50 even after the manual feed tray becomes empty (YES at step S15), and sets the continuity 926 to "00" (step S19) in a case where the received user operation indicates that the image formation is continued with the "specified type" indicated by the paper type 554 of the job 50 until the manual feed tray becomes empty (NO at step S15).

Many users generally desire printing under an optimum condition of the MFP 1 according to the paper type from the viewpoint of image quality and reliability. Some users may prefer printing on plain paper with high productivity even in a case where thick paper is desirable from the viewpoint of image quality. According to the variation in FIG. 19, one user (individual) may apply printing with the paper type specified by the user himself/herself only to the printing of the job 50 immediately after (step S13). Such a mechanism in which the paper type 554 specified by the user is temporarily used as the selected type may prevent an influence regarding the paper type specification of the one user on the image formation of other users while supporting ways of using the MFP 1 according to the requests of various users.

In FIG. 19, in the different type case, the paper type 554 specified by the user of the job 50 may be continuously set as the "selected type" (steps S17 and S19). This continuation time may be specified as until the paper P2 in the paper feed tray becomes empty (step S19) or until after the empty (step S17). As a result, even in a case where the different type case is detected, it is possible to continuously perform the printing using the paper P2 of the specified type matching the user's request regardless of the detected type, and the user may also set a length of the continuation time.

<11. Flowchart When Executing Job>

Figure 20:
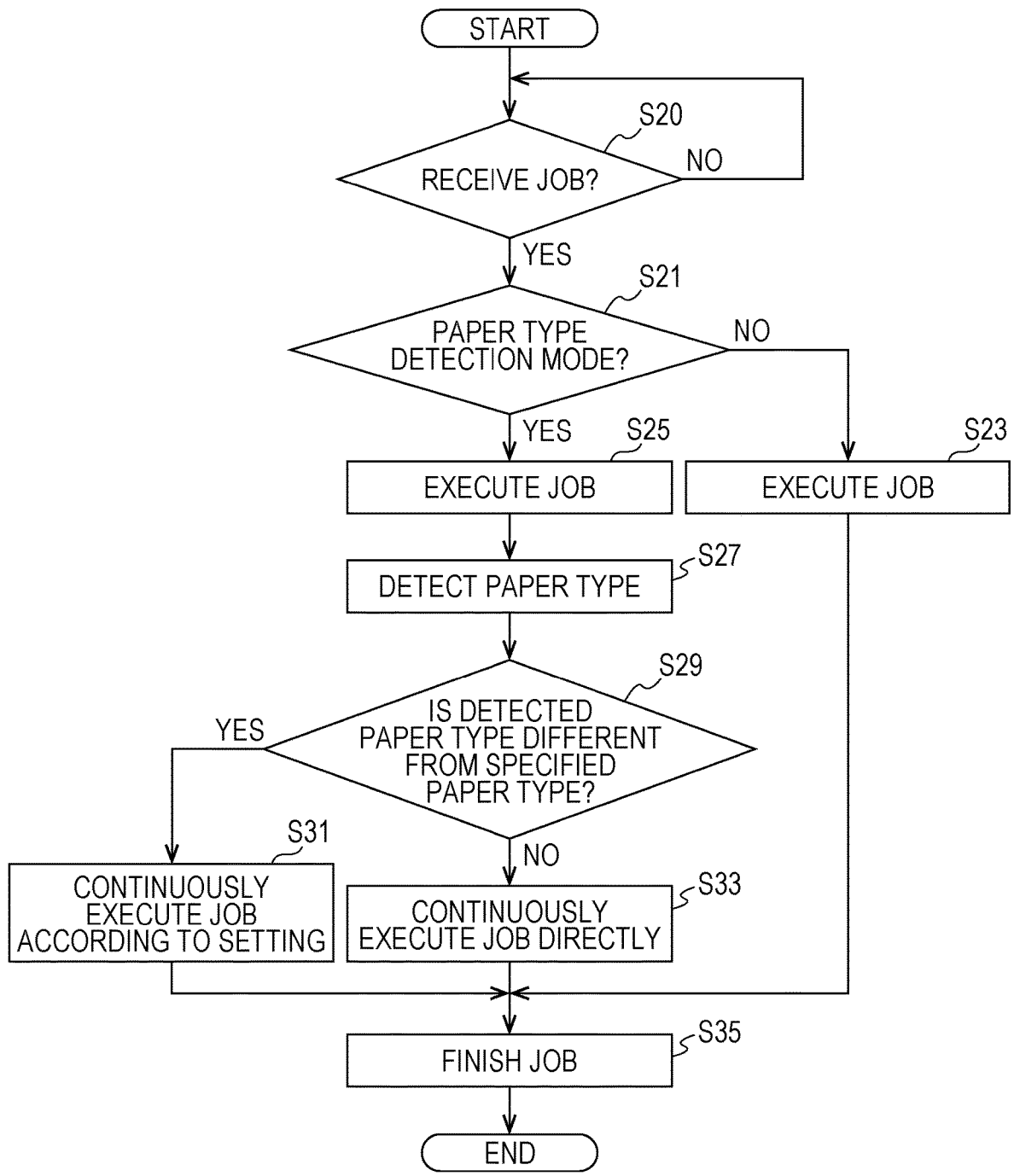
FIG. 20 is a flowchart illustrating processing in a case of executing the job according to this embodiment.

FIG. 20 is a flowchart of processing in a case of executing the job according to this embodiment. This flowchart is implemented by the CPU 101 executing an application program 910 including the job processing program 912.

With reference to FIG. 20, the CPU 101 determines whether the job 50 based on the user operation on the operation panel 9 or the job 50 transferred from the terminals 200 and 300 is received (step S20). When it is determined that the job 50 is not received (NO at step S20), the CPU 101 repeats step S20, but when it is determined that the job 50 is received (YES at step S20), the procedure shifts to step S21.

At step S21, the CPU 101 determines whether the detection mode of the different type case is set in the MFP 1 (step S21). When it is determined that the detection mode of the different type case is not set (NO at step S21), at step S23, the CPU 101 controls each unit of the MFP 1 and executes the job 50 as usual.

When the CPU 101 determines that the detection mode of the different type case is set (YES at step S21), at step S25, the CPU 101 controls each unit of the MFP 1 and executes the job 50. At the time of image formation by the execution of the job 50, the CPU 101 outputs the detected type on the basis of the output from the paper sensor 500 (step S27).

The CPU 101 compares the specified type indicated by the paper type 554 of the job 50 with the detected type, and determines whether the different type case is detected on the basis of a comparison result (step S29). When determining that the different type case is detected (YES at step S29), the CPU 101 determines the selected type as the paper type of the paper P2 for continuing the image formation in accordance with the setting data (paper type 923, selection setting 924, priority matter 925, continuity 926, and notification 927) associated with the user ID 921 that matches the user ID 552 of the job 50, and continuously executes image formation (printing) based on the job 50 on the paper P2 of the determined selected type (step S31). When it is determined that no different type case is detected (NO at step S29), the CPU 101 continuously executes the job 50 without determining the selected type (step S33). Thereafter, the CPU 101 finishes the execution of the job 50 (step S35), and a series of processing is finished.

<12. Configuration of Terminal>

Figure 21:
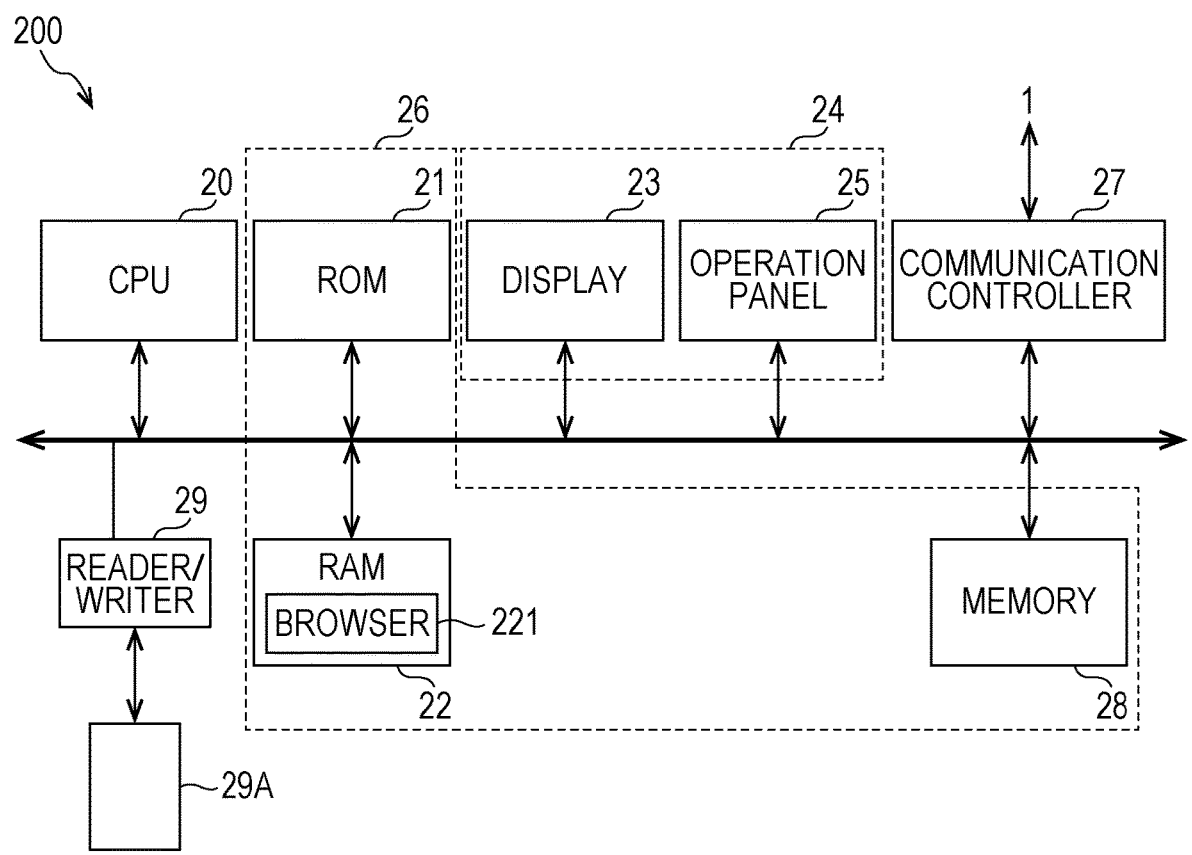
FIG. 21 is a diagram schematically illustrating an example of a configuration of a terminal according to this embodiment.

FIG. 21 is a diagram schematically illustrating an example of a configuration of the terminal 200 according to this embodiment. With reference to FIG. 21, the terminal 200 is provided with a CPU 20 corresponding to a control unit for controlling the terminal 200, a display 23, an operation panel 25 operated by the user for inputting information to the terminal 200, a storage unit 26, and a communication controller 27. The storage unit 26 includes a ROM 21 and a RAM 22 for storing a program executed by the CPU 20 and data, a memory 28 including a hard disk device, and a reader/writer 29. They communicate with each other over an internal bus. The display 23 and the operation panel 25 may be provided as an integrally formed touch panel 24. The communication controller 27 includes a communication circuit such as an NIC or a LAN circuit for the terminal 200 to communicate with the MFP 1 or another terminal. The reader/writer 29 is configured such that a memory card 29A such as an SD card, which is an example of an external storage medium, may be detachably attached. The reader/writer 29 reads a program or data from the attached memory card 29A, and the read program or data is stored in the storage unit 26 and executed by the CPU 20.

A route for setting the setting data 92 described above in the MFP 1 is not limited to the route from the operation panel 9 of the MFP 1. For example, the user may set the same by operating the terminal 200. In this embodiment, the MFP 1 may operate as a web server, and the terminal 200 may operate as a client of the web server. The CPU 101 of the MFP 1 communicates with a browser 221 of the terminal 200, the browser 221 transmits a web page including a UI screen for receiving the user operation in FIGS. 14 to 18 to the terminal 200, and the terminal 200 displays the received web page as a browser screen on the display 23 of the touch panel 24 by the browser 221. The terminal 200 transmits data based on a user operation received via the browser screen by the browser 221 to the MFP 1 as the web server. The MFP 1 stores the data received from the terminal 200 as the setting data 92.

Not only the terminal 200 but also the portable terminal 300 may operate as the client of the web server similarly to the terminal 200. Therefore, the MFP 1 may store the data received from the browser of the terminal 300 as the setting data 92.

A module corresponding to the browser 221 may be included in a program of a printer driver included in the terminal 200, or may be provided as a program for extending the printer driver, and a providing mode of the module is not limited.

The program of the printer driver of the terminal 200 or the terminal 300 may present the UI screen in FIGS. 14 to 18, acquire the setting data 92 from the user via the UI screen, and transfer the acquired setting data 92 to the MFP 1.

The terminal 200 or the terminal 300 according to this embodiment is an example of an information processing terminal that communicates with the image forming apparatus (MFP 1) that forms an image on the sheet on the conveyance path. The terminal 200 or 300 is provided with the setting unit 193 that receives the user setting (setting data 92) regarding the image formation, and a transmitter (communication controller 27) that transmits the user setting received by the setting unit to the image forming apparatus, and the user setting includes the user setting data 928 for allowing the image forming apparatus to continuously perform the image formation in a case where the type of sheet on the conveyance path is different from the type of sheet specified by the user.

Note that, in this embodiment, the paper P2 the paper type of which is detected is not limited to the paper P2 conveyed on the conveyance path, and may be any paper P2 on which an image is formed by the image forming apparatus. For example, the image forming apparatus may have a configuration in which the paper sensor 500 is installed in the tray that supplies the paper P2 to the conveyance path. In this case, when a start button of the operation panel 9 is operated or the execution of the job is started, the CPU 101 may detect the paper type of the paper P2 of the tray (that is, the paper P2 on which an image is formed) on the basis of detection by the paper sensor 500 of the tray, and continuously perform the image formation described above on the basis of a difference between the detected paper type and the paper type specified by the user.

<13. Program>

The application program 910 including the program for setting the setting data 92 using the UI screen in FIGS. 14 to 18 in the MFP 1, the program for executing the job 50 according to the setting data 92 and the like may also be provided as a program product by being recorded in a computer-readable storage medium such as an external storage medium 120 attached, via a memory I/F 119, to the MFP 1 as a computer including a processor. Alternatively, the program may be provided by being recorded on a recording medium such as the HDD 107 built in the computer. The program may also be provided by downloading via the network 110 or wireless communication. The program may be executed by one or more processors such as the CPU 101, or a combination of the processor and a circuit such as an application specific integrated circuit (ASIC) or a field-programmable gate array (FPGA).

The program (for example, the browser 221) of the terminal 200 for setting the setting data 92 using the UI screen in FIGS. 14 to 18 in the MFP 1 may be recorded in a computer-readable storage medium such as the memory card 29A attached to the terminal 200 as a computer and provided as a program product. Alternatively, the program may be provided by being recorded in a recording medium such as a hard disk of the memory 28 built in the computer. The program may also be provided by downloading via the network 110 or wireless communication. The program may be executed by one or more processors such as the CPU 20, or by a combination of a processor and a circuit such as an ASIC or an FPGA.

<14. Advantage>

In this embodiment, even in a case where the paper type detected by the paper type detection unit 190 is different from the paper type 554 (specified type) specified by the user for the job 50 during job execution, that is, at the time of image formation, and the different type case is detected, the execution of the job 50 is not interrupted, and the MFP 1 continuously executes the job 50 according to the stored user setting data 92. Therefore, the user does not need to mind the state of the MFP 1 after the job 50 is started to be executed (that is, whether the different type case is detected), and user convenience is improved. Even if the MFP 1 detects the different type case at the time of executing one job 50, the MFP 1 may execute the next job 50 without interrupting the execution of the job 50, and improve the productivity regarding the image formation in the MFP 1.

Although embodiments of the present invention have been described and illustrated in detail, the disclosed embodiments are made for purposes of illustration and example only and not limitation. The scope of the present invention should be interpreted by terms of the appended claims, and all modifications within the scope are included.

What is claimed is:

1. An image forming apparatus comprising:
 a former that performs image formation on a sheet conveyed on a conveyance path;
 a first hardware processor that detects a type of the sheet on which the image is formed;
 a second hardware processor that receives specification of a type of a sheet from a user;
 a third hardware processor that receives a user setting regarding the image formation, wherein
 the user setting includes
 a setting indicating whether a first image forming condition or a second image forming condition is used for the image formation in a case where the sheet type detected by the first hardware processor is different from the sheet type specified by the user received by the second hardware processor, the first image forming condition being set according to the sheet type detected by the first hardware processor, the second image forming condition being set according to the sheet type received by the second hardware processor; and
 a seventh hardware processor that causes the former to perform the image formation using the second image forming condition without suspending a print job or displaying a warning when the setting indicates the second image forming condition is used for the image formation in a case where the sheet type detected by the first hardware processor is different from the sheet type specified by the user received by the second hardware processor.

2. The image forming apparatus according to claim 1, wherein
the third hardware processor receives a setting of priority indicating that one of the sheet type detected by the first hardware processor and the sheet type received by the second hardware processor is used in preference to the other for the image formation.

3. The image forming apparatus according to claim 2, wherein
the priority is based on a characteristic regarding the image formation by the former.

4. The image forming apparatus according to claim 3, wherein
the characteristic includes at least one of an image quality, a speed, and power consumption in the image formation by the former.

5. The image forming apparatus according to claim 1, wherein
the third hardware processor includes a user interface (UI), and receives the user setting regarding the image formation in response to a user operation on the UI.

6. The image forming apparatus according to claim 1, further comprising:
a fourth hardware processor that controls the former to perform the image formation according to the setting received by the third hardware processor in a case where the sheet type detected by the first hardware processor is different from the sheet type received by the second hardware processor when the image formation is performed by the former.

7. The image forming apparatus according to claim 1, wherein
when the second hardware processor receives the specification of the sheet type from the user, the third hardware processor operates to receive a setting for allowing the image formation to be formed.

8. The image forming apparatus according to claim 1, further comprising:
a supplier capable of storing a sheet to be supplied to the conveyance path, wherein
when the sheet is stored in the supplier by the user, the third hardware processor operates to receive a setting for allowing the image formation to be performed.

9. The image forming apparatus according to claim 1, wherein
the setting for allowing the former to perform the image formation includes a setting indicating to which of one job or a plurality of jobs of the user the setting is applied.

10. The image forming apparatus according to claim 1, wherein
the third hardware processor receives, for each of a plurality of users of the image forming apparatus, the setting for allowing the former to perform the image formation from the user.

11. The image forming apparatus according to claim 1, further comprising:
one or a plurality of suppliers capable of storing a sheet to be supplied to the conveyance path, wherein
the second hardware processor includes
a receiver that receives specification of a type of the sheet to be stored in the supplier from the user for each of the one or a plurality of suppliers, the third hardware processor includes
a fifth hardware processor that receives the setting for allowing the former to perform the image formation for each of the suppliers, and
the user setting includes
the setting for allowing the former to perform the image formation in a case where the sheet type detected by the first hardware processor is different from the sheet type specified by the user with respect to the supplier that supplies the sheet to the conveyance path.

12. The image forming apparatus according to claim 1, further comprising:
a communicator with which the image forming apparatus communicates with an information processing terminal, wherein
the third hardware processor receives a user setting regarding the image formation from the information processing terminal by receiving the user setting via the communicator.

13. The image forming apparatus according to claim 1, wherein
the user setting further includes a setting indicating that notification is output to the user in response to a fact that a combination of the detected sheet type and the sheet type specified by the user satisfies a predetermined condition.

14. The image forming apparatus according to claim 1, further comprising:
a sixth hardware processor that selects a type of a sheet for allowing the image formation to be performed according to the setting in a case where the sheet type detected by the first hardware processor is different from the sheet type specified by the user received by the second hardware processor when the image formation is performed, wherein
a process control condition of the image formation is set according to a difference between the sheet type detected by the first hardware processor and the selected sheet type.

15. The image forming apparatus according to claim 1, wherein
the seventh hardware processor is configured to:
determine that (i) the setting indicates the second image forming condition is used for the image formation and (ii) the sheet type detected by the first hardware processor is different from the sheet type specified by the user received by the second hardware processor, and
in response to determining that (i) the setting indicates the second image forming condition is used for the image formation and (ii) the sheet type detected by the first hardware processor is different from the sheet type specified by the user received by the second hardware processor, automatically cause the former to perform the image formation using the second image forming condition.

16. A method performed by a computer, the method comprising:
performing image formation on a sheet conveyed on a conveyance path of an image forming apparatus;
detecting a type of the sheet on which the image is formed;
receiving specification of a type of a sheet from a user;
receiving a user setting regarding the image formation, wherein the user setting includes
a setting indicating whether a first image forming condition or a second image forming condition is used for the image formation in a case where the sheet type detected in the detecting is different from the sheet type specified by the user received in the receiving the specification, the first image forming condition being set according to the sheet type detected in the detecting of the type of the sheet on which the image is formed, the second image forming condition being set according to the sheet type received in the receiving of the specification of the type of the sheet from the user; and
causing the former to perform the image formation using the second image forming condition without suspending a print job or displaying a warning when the setting indicates the second image forming condition is used for the image formation in a case where the sheet type detected by the first hardware processor is different from the sheet type specified by the user received by the second hardware processor.

17. A non-transitory recording medium storing a computer readable program executed by a computer, the program causing the computer to perform:
performing image formation on a sheet conveyed on a conveyance path;
detecting a type of the sheet on which the image is formed;
receiving specification of a type of a sheet from a user;
receiving a user setting regarding the image formation, wherein
the user setting includes
a setting indicating whether a first image forming condition or a second image forming condition is used for the image formation in a case where the sheet type detected in the detecting is different from the sheet type specified by the user received in the receiving the specification, the first image forming condition being set according to the sheet type detected in the detecting of the type of the sheet on which the image is formed, the second image forming condition being set according to the sheet type received in the receiving of the specification of the type of the sheet from the user; and
causing the former to perform the image formation using the second image forming condition without suspending a print job or displaying a warning when the setting indicates the second image forming condition is used for the image formation in a case where the sheet type detected by the first hardware processor is different from the sheet type specified by the user received by the second hardware processor.

* * * * *